(12) United States Patent
Kawashima

(10) Patent No.: US 6,949,853 B2
(45) Date of Patent: Sep. 27, 2005

(54) MAGNETIC BEARING DEVICE AND PUMP DEVICE WITH THE MAGNETIC BEARING DEVICE MOUNTED THERETO

(75) Inventor: Toshiaki Kawashima, Chiba (JP)

(73) Assignee: BOC Edwards Japan Limited, Tokyo (JP)

(*) Notice: Subject to any disclaimer, the term of this patent is extended or adjusted under 35 U.S.C. 154(b) by 0 days.

(21) Appl. No.: 10/803,776

(22) Filed: Mar. 18, 2004

(65) Prior Publication Data

US 2005/0179333 A1 Aug. 18, 2005

(30) Foreign Application Priority Data

Mar. 19, 2003 (JP) .............................. 2003-075303

(51) Int. Cl.[7] .............................................. H02K 7/09
(52) U.S. Cl. ..................................................... 310/90.5
(58) Field of Search ........................ 310/90.5, 90, 68 R; 318/661, 623, 648, 128, 293

(56) References Cited

U.S. PATENT DOCUMENTS

| | | | |
|---|---|---|---|
| 4,392,693 A | 7/1983 | Habermann et al. | 308/10 |
| 5,262,692 A | 11/1993 | Williams et al. | 310/90.5 |
| 5,543,673 A * | 8/1996 | Katsumata et al. | 310/90.5 |
| 6,278,251 B1 * | 8/2001 | Schob | 318/293 |

FOREIGN PATENT DOCUMENTS

JP 03222130 12/2003

* cited by examiner

Primary Examiner—Tran Nguyen
Assistant Examiner—Leda Pham
(74) Attorney, Agent, or Firm—Adams & Wilks

(57) ABSTRACT

A magnetic bearing device is provided which is capable of reducing vibration, as well as electric and magnetic noise, generated from a pump device while making it possible to control the position of a rotor at high speed and high power. Also provided is a pump device having the magnetic bearing device mounted thereto. Switching is made between a high-voltage mode in which an electromagnet coil is supplied with electric power from a high voltage power source and a low voltage mode in which the electromagnet coil is supplied with electric power from a low voltage power source. The switching is made based on whether or not a current change speed is below a reference current change speed. When the current change speed is equal to or larger than the reference current change speed, the device is switched to the high voltage mode. When the current change speed is less than the reference current change speed, the device is switched to the low voltage mode.

27 Claims, 10 Drawing Sheets

MODE SWITCHING SIGNAL

FIG. 2

| POWER SOURCE TO WHICH ELECTROMAGNET COIL IS CONNECTED | ELECTROMAGNET CURRENT iL | TRANSISTOR | | | |
|---|---|---|---|---|---|
| | | 261 | 262 | 161 | 162 |
| HIGH VOLTAGE POWER SOURCE (HIGH VOLTAGE MODE) | INCREASE | (off) | (off) | on | on |
| | REDUCTION | off | off | off | off |
| | CONSTANT | off | (off) | off | on |
| | | (off) | off | on | off |
| LOW VOLTAGE POWER SOURCE (LOW VOLTAGE MODE) | INCREASE | on | (on) | off | on |
| | REDUCTION | off | on | off | off |
| | CONSTANT | off | (on) | off | on |
| | | on | on | off | off |

FIG. 6

| POWER SOURCE TO WHICH ELECTROMAGNET COIL IS CONNECTED | ELECTROMAGNET CURRENT iL | TRANSISTOR | | | |
|---|---|---|---|---|---|
| | | 361 | 362 | 161 | 162 |
| HIGH VOLTAGE POWER SOURCE (HIGH VOLTAGE MODE) | INCREASE | on | (off) | on | on |
| | REDUCTION | (on) | off | off | off |
| | CONSTANT | (on) | (off) | off | on |
| | | on | off | on | off |
| LOW VOLTAGE POWER SOURCE (LOW VOLTAGE MODE) | INCREASE | off | (on) | on | on |
| | REDUCTION | (off) | on | off | off |
| | CONSTANT | (off) | (on) | off | on |
| | | off | on | on | off |

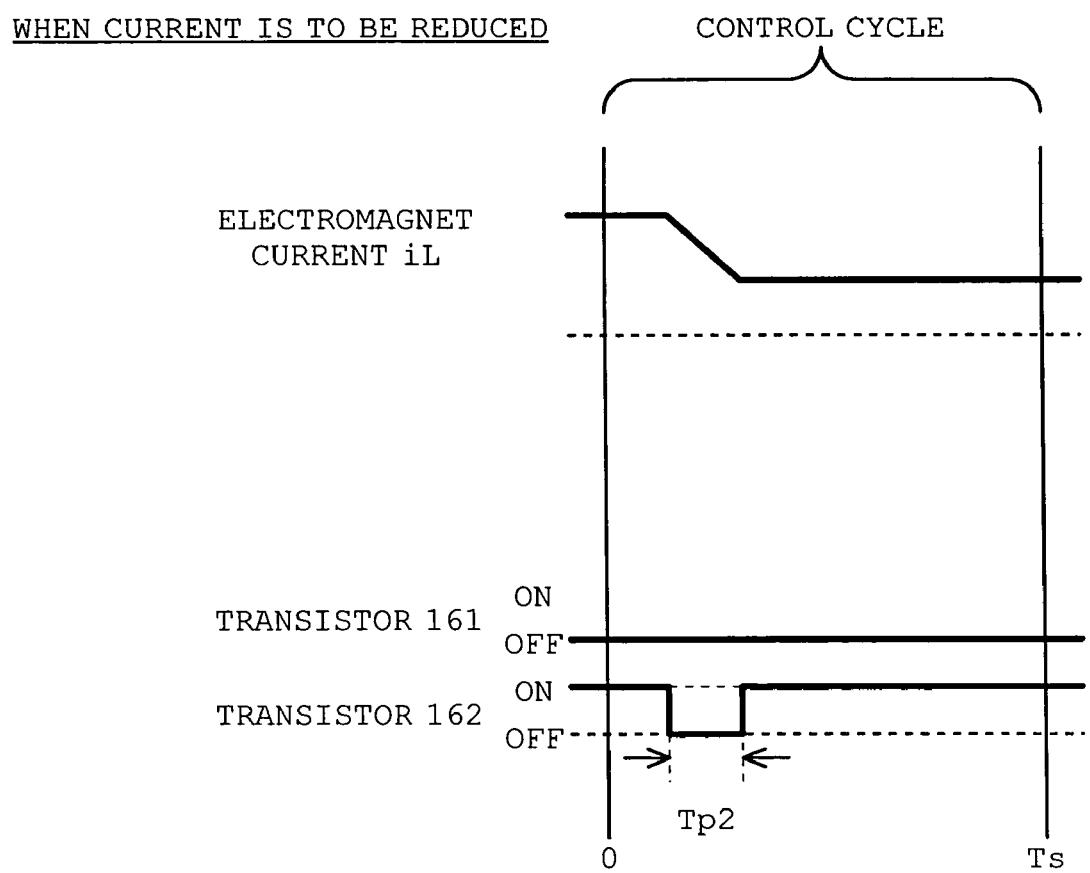

MAGNETIC BEARING DEVICE AND PUMP DEVICE WITH THE MAGNETIC BEARING DEVICE MOUNTED THERETO

BACKGROUND OF THE INVENTION

1. Field of the Invention

The present invention relates to a magnetic bearing device and a pump device with the magnetic bearing device mounted thereto. More specifically, the present invention relates to a magnetic bearing device capable of reducing vibration, as well as electric and magnetic noise, generated from a pump device while making it possible to control the position of a rotor at high speed and high power, and to a pump device having the magnetic bearing device mounted thereto.

2. Description of the Related Art

With the development of electronics in recent years, demands for semiconductors for forming memories, integrated circuits, etc. are rapidly increasing.

Those semiconductors are manufactured such that impurities are doped into a semiconductor substrate with a very high purity to impart electrical properties thereto, or semiconductor substrates with minute circuit patterns formed thereon are laminated.

Those manufacturing steps must be performed in a chamber with a high vacuum state so as to avoid influences of dust etc. in the air. A vacuum pump is generally used as a pump device to evacuate the chamber. In particular, a turbo molecular pump, which is one kind of the vacuum pumps, is widely used since it entails little residual gas and is easy of maintenance and so on.

The semiconductor manufacturing process includes a number of steps in which various process gases are caused to act onto a semiconductor substrate, and the turbo molecular pump is used not only to evacuate the chamber but also to discharge those process gases from the chamber.

Further, in equipment for an electron microscope etc., a turbo molecular pump is used to create a high vacuum state in the chamber of the electron microscope etc. in order to prevent refraction etc. of an electron beam caused by the presence of dust or the like.

FIG. 7 is a longitudinal sectional view of the turbo molecular pump.

In FIG. 7, a turbo molecular pump 100 includes an outer cylinder 127 with an intake hole 101 formed on top thereof. Provided inside the outer cylinder 127 is a rotor 103 having in its periphery a plurality of rotor blades 102a, 102b, 102c, . . . serving as turbine blades for sucking and discharging gas and formed radially in a number of stages.

At the center of the rotor 103, a rotor shaft 113 is mounted with being supported in a levitating state in the air and controlled in position, for example, by a 5-axis control magnetic bearing.

Upper radial electromagnets 104 include four electromagnets arranged in pairs in X- and Y-axis directions. Further, there is provided an upper radial sensor 107 constituted of four electromagnets arranged in close proximity to and in correspondence with the upper radial electromagnets 104. The upper radial sensor 107 detects radial displacement of the rotor 103, transmitting a detection signal to a control device (not shown in the drawing).

In this control device, excitation of the upper radial electromagnets 104 is controlled by an amplifier circuit 150 (will be discussed later) through a compensation circuit having a PID adjusting function, on the basis of a displacement signal detected by the upper radial sensor 107, thus performing adjustment of the radial position of the upper portion of the rotor shaft 113.

The rotor shaft 113 is formed of a high-magnetic-permeability material (e.g., iron) and is adapted to be attracted by the magnetic force of the upper radial electromagnets 104. Such adjustment is conducted independently in the X-axis direction and the Y-axis direction.

Further, lower radial electromagnets 105 and a lower radial sensor 108 are arranged in the same way as the upper radial electromagnets 104 and the upper radial sensor 107. Like the radial position of the upper portion of the rotor shaft 113, the radial position of the lower portion of the rotor shaft 113 is adjusted.

Further, axial electromagnets 106A and 106B each are arranged on the upper and lower sides of a metal disc 111 provided in the lower portion of the rotor shaft 113. The metal disc 111 is formed of a high-magnetic-permeability material such as iron. To detect axial displacement of the rotor shaft 113, an axial sensor 109 is provided, which transmits an axial displacement signal to the control device.

The axial electromagnets 106A and 106B are excitation-controlled by the amplifier circuit 150 through the compensation circuit, which has a PID adjusting function, of the control device on the basis of the axial displacement signal. The axial electromagnet 106A upwardly attracts the magnetic disc 111 by the magnetic force, and the axial electromagnet 106B downwardly attracts the magnetic disc 111.

In this way, the control device has a function to appropriately control the magnetic force exerted on the metal disc 111 by the axial electromagnets 106A and 106B to magnetically levitate the rotor shaft 113 in the axial direction, thereby retaining the rotor shaft 113 in the space in a non-contact state.

Note that descriptions will be given later on the amplifier circuit 150 that drives, through excitation, the upper radial electromagnets 104, the lower radial electromagnets 105, and the axial electromagnets 106A and 106B.

A motor 121 is equipped with a plurality of magnetic poles, which are arranged circumferentially to surround the rotor shaft 113. The magnetic poles are controlled by the control device to rotate the rotor shaft 113 through an electromagnetic force acting between the rotor shaft 113 and the magnetic poles.

The motor 121 also has an RPM sensor (not shown in the drawing) incorporated to output a detection signal, which is used for detection of RPM of the rotor shaft 113.

A phase sensor (not shown in the drawing) is attached, for example, in the vicinity of the lower radial sensor 108 to detect the phase of rotation of the rotor shaft 113. From detection signals of the phase sensor and the RPM sensor both, the control device detects positions of the magnetic poles.

A plurality of stationary blades 123a, 123b, 123c, . . . are arranged so as to be spaced apart from the rotor blades 102a, 102b, 102c, . . . by small gaps. To downwardly transfer the molecules of exhaust gas through collision, the rotor blades 102a, 102b, 102c, . . . are inclined by a predetermined angle with respect to a plane perpendicular to the axis of the rotor shaft 113.

Similarly, the stationary blades 123 are also inclined by a predetermined angle with respect to a plane perpendicular to the axis of the rotor shaft 113, and extend toward the inner side of the outer cylinder 127 to be arranged alternately with the rotor blades 102.

The stationary blades 123 are supported at one end by being inserted into gaps between a plurality of stationary blade spacers 125a, 125b, 125c, . . . stacked together in stages.

The stationary blade spacers 125 are ring-shaped members, which are formed of a metal, such as aluminum, iron, stainless steel, or copper, or an alloy containing such metal as a component.

In the outer periphery of the stationary blade spacers 125, the outer cylinder 127 is secured in position with a small gap therebetween. At the bottom of the outer cylinder 127, there is arranged a base portion 129, and a threaded spacer 131 is arranged between the lowermost one of the stationary blade spacers 125 and the base portion 129. In the portion of the base portion 129 below the threaded spacer 131, there is formed a discharge outlet 133 which communicates with the outside.

The threaded spacer 131 is a cylindrical member formed of a metal, such as aluminum, copper, stainless steel, or iron, or an alloy containing such metal as a component, and has a plurality of spiral thread grooves 131a in its inner peripheral surface.

The spiral direction of the thread grooves 131a is determined such that when the molecules of the exhaust gas move in the rotating direction of the rotor 103, these molecules are transferred toward the discharge outlet 133.

Connected to the lowermost one of the rotor blades 102a, 102b, 102c, . . . of the rotor 103 is a rotor blade 102d, which extends vertically downwards. The outer peripheral surface of the rotor blade 102d sticks out toward the inner peripheral surface of the threaded spacer 131 in a cylindrical shape, and is in close proximity to the inner peripheral surface of the threaded spacer 131 with a predetermined gap therebetween.

The base portion 129 is a disc-like member constituting the base of the turbo molecular pump 100, and is generally formed of a metal, such as iron, aluminum, or stainless steel.

The base portion 129 physically retains the turbo molecular pump 100, and also functions as a heat conduction passage. Thus, the base portion 129 is preferably formed of a metal that is rigid and of high heat conductivity, such as iron, aluminum, or copper.

In the above-described construction, when the rotor blades 102 are driven and rotated by the motor 121 together with the rotor shaft 113, an exhaust gas from a chamber is sucked in through the intake hole 101 by the action of the rotor blades 102 and the stationary blades 123.

The exhaust gas sucked in through the intake hole 101 passes between the rotor blades 102 and the stationary blades 123, and is transferred to the base portion 129. At this point, the temperature of the rotor blades 102 is raised by frictional heat generated as the exhaust gas comes into contact with the rotor blades 102 and by heat generated and conducted from the motor 121. Such heat is transferred to the stationary blades 123 through radiation or through conduction of gas molecules of exhaust gas or the like.

The stationary blade spacers 125 are joined to one another on the outer periphery and send, to the outside, heat which the stationary blades 123 receive from the rotor blades 102 as well as frictional heat generated upon contact between exhaust gas and the stationary blades 123.

The exhaust gas transferred to the base portion 129 is sent to the discharge outlet 133 while being guided by the thread grooves 131a of the threaded spacer 131.

In the description above, the threaded spacer 131 is placed on the outer periphery of the rotor blade 102d and the inner peripheral surface of the threaded spacer 131 is scored with the thread grooves 131a. This may be reversed and the outer peripheral surface of the rotor blade 102d may be scored with thread grooves, whereas a spacer of which inner peripheral surface forms a cylindrical shape surrounds the rotor blade 102d.

Further, in order to prevent the exhaust gas sucked in through the intake hole 101 from entering the electrical portion composed of the motor 121, the lower radial electromagnet 105, the lower radial sensor 108, the upper radial electromagnet 104, the upper radial sensor 107, etc., the electrical portion is covered with a stator column 122, and the interior of this electrical portion is maintained at a predetermined pressure with a purge gas.

For this purpose, the base portion 129 is equipped with piping (not shown in the drawing), and the purge gas is introduced through the piping. The purge gas introduced is passed through the gap between a protective bearing 120 and the rotor shaft 113, the gap between the rotor and stator of the motor 121, and the gap between the stator column 122 and the rotor blades 102 before it is transmitted to the discharge outlet 133.

The turbo molecular pump 100 requires control based on individually adjusted specific parameters (e.g., identification of the model and characteristics corresponding to the model). To store the control parameters, the turbo molecular pump 100 contains an electronic circuit portion 141 in its main body. The electronic circuit portion 141 is composed of a semiconductor memory, such as EEP-ROM, electronic parts, such as semiconductor devices for access to the semiconductor memory, a substrate 143 for mounting these components thereto, etc.

This electronic circuit portion 141 is accommodated under an RPM sensor (not shown in the drawing) near the center of the base portion 129 constituting the lower portion of the turbo molecular pump 100, and is closed by a hermetic bottom cover 145.

In some cases, a process gas is introduced to a chamber with its temperature raised in order to enhance the reactivity. Such process gas is cooled upon discharge and, reaching a certain temperature, could change into a solid to precipitate in the exhaust system. This type of process gas, one that becomes solid when cooled, adheres to the interior of the turbo molecular pump 100 and builds up.

For instance, a vapor pressure curve shows that $SiCl_4$ used as a process gas for an Al etching device precipitates at low vacuum (760 torr to $10^{-2}$ torr) and low temperature (about 20° C.) to produce a solid product (e.g., $AlCl_3$), which adheres and builds up in the turbo molecular pump 100. As the precipitate of the process gas builds up in the turbo molecular pump 100, the pump flow path is clogged with the deposit, thereby lowering the performance of the turbo molecular pump 100. The solid product tends to coagulate and adhere in the area near the discharge outlet where the temperature is low, in particular, around the rotor blades 102 and the threaded spacer 131.

A conventional measure taken to solve this problem is to wind a heater (not shown in the drawing) and a ring-like water-cooled tube 149 around the outer periphery of the base portion 129 or other portion while burying a temperature sensor (not shown in the drawing) (e.g., thermistor) in, for example, the base portion 129, so that the temperature of the base portion 129 is kept high at a set temperature by controlling the heating effect of the heater and the cooling effect of the water-cooled tube 149 based on a signal from the temperature sensor (temperature management system, hereinafter abbreviated as TMS).

Given next is a detailed description of the amplifier circuit 150, which drives, through excitation, the upper radial electromagnets 104, the lower radial electromagnets 105, and the axial electromagnets 106A and 106B of the turbo molecular pump 100 structured as above.

A circuit diagram of this amplifier circuit is shown in FIG. 8.

In FIG. 8, the electromagnet coil 151, which constitutes the upper radial electromagnets 104 or other electromagnets, is connected at one end to a positive electrode 171a of a power source 171 through a transistor 161 and is connected at the other end to a negative electrode 171b of the power source 171 through a current detecting circuit 181 and through a transistor 162.

The transistors 161 and 162 are so-called power MOSFETs, which are structured to have diodes connected between their sources and drains.

A cathode terminal 161a of a diode of the transistor 161 is connected to the positive electrode 171a, whereas an anode terminal 161b of the diode is connected to one end of the electromagnet coil 151.

A cathode terminal 162a of a diode of the transistor 162 is connected to the current detecting circuit 181, whereas an anode terminal 162b of the diode is connected to the negative electrode 171b.

On the other hand, a diode 165 provided for current regeneration is connected at its cathode terminal 165a to one end of the electromagnet coil 151 and is connected at its anode terminal 165b to the negative electrode 171b.

Similarly, a diode 166 for current regeneration has a cathode terminal 166a connected to the positive electrode 171a and has an anode terminal 166b connected to the other end of the electromagnet coil 151 through the current detecting circuit 181.

The current detecting circuit 181 is a hole sensor serving as a current sensor, for example.

The amplifier circuit 150 structured as above is for the electromagnets 104, 105, 106A, and 106B, whereas another amplifier circuit 150 is built for other electromagnets 105, 106A, and 106B. Accordingly, in the case of a 5-axis control magnetic bearing, there are ten of the same amplifier circuits (each of which is denoted by 150) connected in parallel to the power source 171.

An amplifier control circuit 191 is a circuit in a digital signal processor unit (not shown in the drawing) (hereinafter abbreviated as DSP unit) of the control device. The amplifier control circuit 191 makes it possible to switch on and off the transistors 161 and 162.

To elaborate, the DSP unit and its amplifier control circuit 191 compare a current value detected by the current detecting circuit 181 (a signal that reflects this current value is called a current detection signal 191c) with a predetermined current command value. Based on the result of the comparison, the pulse width (pulse width time Tp1 or Tp2) of pulses to be generated in a control cycle Ts, which is one cycle by PWM control, is determined. Then the amplifier control circuit 191 outputs gate drive signals 191a and 191b having the thus determined pulse width to gate terminals of the transistors 161 and 162.

The power source 171 has to control the position of the rotor 103 at high speed and high power upon passing a resonance point while the rotor 103 is operated at an accelerated rotation speed, or upon encountering disturbance during rotor's constant speed operation, or like other cases. For that reason, the power source 171 has to be capable of handling a rapid increase (or decrease) in current flowing in the electromagnet coil 151 and accordingly is a high voltage power source of about 50 V, for example.

Usually, a capacitor (omitted from the drawing) is connected between the positive electrode 171a and the negative electrode 171b of the power source 171 in order to stabilize the power source 171.

In this structure, the transistors 161 and 162 are both turned on to increase a current flowing in the electromagnet coil 151 (hereinafter referred to as electromagnet current iL) and the electromagnet current iL is reduced by turning both of the two transistors off.

When only one of the transistors 161 and 162 is turned on, a so-called flywheel current is maintained. By letting a flywheel current flow in the amplifier circuit 150, the hysteresis loss in the amplifier circuit 150 can be reduced and the power consumption of the circuit in total can be lowered as disclosed in JP 3176584 B. In addition, with the transistors 161 and 162 controlled in this manner, high-frequency noise of harmonics or the like is reduced in the turbo molecular pump 100. Moreover, the electromagnet current iL flowing in the electromagnet coil 151 can be detected by measuring the flywheel current with the current detecting circuit 181.

Specifically, in the case where the current command value is larger than a current value detected, the transistors 161 and 162 are both turned on once in the control cycle Ts (for example, 100 μs) for a time period that corresponds to the pulse width time Tp1 as shown in FIG. 9. The electromagnet current iL during this period is thus increased toward a current value iLmax (not shown in the drawing), which is a maximum current possible to flow from the positive electrode 171a to the negative electrode 171b through the transistors 161 and 162.

On the other hand, in the case where the command value is smaller than the detection value, the transistors 161 and 162 are both turned off once in the control cycle Ts for a time period that corresponds to the pulse width time Tp2 as shown in FIG. 10. The electromagnet current iL during this period is thus decreased toward a current value iLmin (not shown in the drawing) that can be regenerated from the negative electrode 171b to the positive electrode 171a through the diodes 165 and 166.

In either case, one of the transistors 161 and 162 is turned on after the elapse of the pulse width time Tp1 or Tp2. Thus a flywheel current is maintained in the amplifier circuit 150 during this period.

As described above, it is necessary for the turbo molecular pump 100 to place the upper radial electromagnets 104 and the upper radial sensor 107 as close to each other as possible.

This also applies to arrangement of other electromagnets and sensors, and the distance between the lower radial electromagnets 105 and the lower radial sensor 108 and the distance between the axial electromagnets 106A and 106B and the axial sensor 109 have to be as short as possible.

Accordingly, it can be said that the electromagnets 104, 105, and 106A and 106B are electrostatically coupled to their respective position sensors 107, 108, and 109.

The rotor shaft 113 and the metal disc 111, which are formed from high-magnetic-permeability materials, are interposed between the electromagnets 104, 105, and 106A and 106B and their respective position sensors 107, 108, and 109, and are magnetically coupled to the electromagnets and to the sensors.

The amplifier control circuit 191 switches on and off the transistors 161 and 162 at high speed within a period equal to or shorter than the control cycle Ts as described above. This could cause electric noise (for example, noise due to an inductance component and noise due to reflection) in the electromagnet coil 151 upon switching on or off the transistors 161 and 162. In addition, electric noise in the electromagnet coil 151 sometimes induces magnetic noise in the electromagnet coil 151.

Electric and magnetic noise generated in the electromagnetic coil 151 can influence the position sensors 107, 108, and 109 coupled to the electromagnet coil 151 electrostatically and magnetically.

If electric noise generated in the electromagnet coil 151 affects the position sensors 107, 108, and 109, noise in an amount corresponding to the noise component could be mixed in with displacement signals detected by the position sensors 107, 108, and 109. A displacement signal with a noise component mixed in is used in PID control by the compensation circuit of the control circuit, which outputs the result of the PID control to the amplifier circuit 150. Consequently, excitation-drive of the electromagnet coil 151 by the amplifier circuit 150 is affected by the noise component mixed in, causing the rotor 103 to vibrate in accordance with an electric noise component that is not the true displacement signal.

Similarly, if magnetic noise generated in the electromagnet coil 151 affects the position sensors 107, 108, and 109, it could cause noise in magnetic fields detected by the position sensors 107, 108, and 109. As in the case of electric noise described above, this allows noise in an amount corresponding to the noise component mixed in with displacement signals detected by the position sensors 107, 108, and 109. Consequently, the rotor 103 vibrates in accordance with a magnetic noise component that is not the true displacement signal.

With the rotor 103 vibrated by a noise component, the vibration is transferred to a chamber to which the turbo molecular pump 100 is connected and influences operations conducted in the chamber, including manufacture of a semiconductor and measurement using an electron microscope.

Moreover, being of electric and magnetic nature, noise components generated in the electromagnet coil 151 could be transferred directly to the chamber to influence semiconductor manufacture, electron microscope measurement, and other operations performed in the chamber. In measurement using an electron microscope, in particular, magnetic noise generated in the electromagnet coil 151 can bend the trajectory of an electron beam emitted in the electron microscope.

Furthermore, electric and magnetic noise in the electromagnet coil 151 is increased in proportion to the voltage level of the power source 171, which as has been described is a high voltage power source of about 50 V, usually, in order to control the position of the rotor 103 at high speed and high power. It is therefore difficult to reduce electric and magnetic noise in the electromagnet coil 151 while controlling the position of the rotor 103 at high speed and high power.

SUMMARY OF THE INVENTION

The present invention has been made in view of the above-mentioned problems inherent in the prior art, and an object of the present invention is therefore to provide a magnetic bearing device that makes it possible to control a position of a rotor at high speed and high power and a pump device having the magnetic bearing device mounted thereto.

Accordingly, the present invention provides a magnetic bearing device, including: a rotor; position control means for controlling at least one of a radial position and an axial position of the rotor using electromagnets; and an excitation-drive control circuit for driving, through excitation, the electromagnets and for controlling excitation-drive of the electromagnets, in which the excitation-drive control circuit is equipped with: a first power source that generates a first electric potential; a second power source that generates a second electric potential lower than the first electric potential; excitation-drive means which has a choice between the first power source and the second power source and which drives, through excitation, the electromagnets with a current supplied from the power source selected; and selection control means for selecting, in accordance with a predetermined operation mode, the power source to be chosen at the excitation-drive means.

In excitation-drive of the electromagnets, a selection is made in accordance with a predetermined operation mode between the first power source and the second power source that generates a lower electric potential than the one generated by the first power source.

This makes it possible to control the position of the rotor at high speed and high power when the first power source is selected, whereas electric and magnetic noise generated in the electromagnets can be reduced by selecting the second power source.

As a result, vibration, as well as electric and magnetic noise, generated from the magnetic bearing device can be reduced while making it possible to control the position of the rotor at high speed and high power.

Also, the magnetic bearing device according to the present invention further includes: current/magnetic flux detecting means for detecting a current or magnetic flux of the electromagnets; computing means for computing a predetermined index value from a change in current or magnetic flux detected by the current/magnetic flux detecting means; and index value judging means for judging whether or not the index value computed by the computing means is below a reference index value, in which the selection control means selects the first power source when the index value judging means judges that the index value is equal to or larger than the reference index value.

In order to control the position of the rotor at high speed and high power, a large current has to be let flow in the electromagnets. Therefore, if high speed and high power are needed in controlling the position of the rotor or not can be judged from whether or not an index value computed based on a change in current flowing in the electromagnets and a change in magnetic flux of the electromagnets is below the reference index value.

Thus a selection can be made between the first power source and the second power source by detecting a current flowing in the electromagnets or a magnetic flux of the electromagnets.

Also, in the magnetic bearing device according to the present invention, the index value is a time differential value or increment or negative increment of the current or the magnetic flux of the electromagnets in a predetermined period, or a mean value of the time differential values or a mean value of the increment or the negative increment in a period longer than the predetermined period.

In this way, a rapid change in current flowing in the electromagnets or in magnetic flux of the electromagnets can be detected by computing a time differential value and an increment or a negative increment from a current flowing in the electromagnets and from a magnetic flux of the electromagnets. When these command values are equal to or larger than the reference command value, the second power source is selected.

Alternatively, a mean value of time differential values or mean increment or negative increment of the current or the magnetic flux of the electromagnets can serve as a command value. This makes it possible to prevent a momentary current ripple or the like from switching the power sources.

The predetermined period is, for example, as long as one cycle of the control cycle of when excitation-drive of the electromagnets is controlled by PWM control. In this case, a period longer than the predetermined period is as long as several cycles of the control cycle.

Also, the magnetic bearing device according to the present invention further includes: RPM detecting means for detecting RPM of the rotor; and RPM judging means for judging whether or not the RPM detected by the RPM detecting means is within a predetermined range, in which the selection control means selects the first power source when the RPM judging means judges that the RPM detected by the RPM detecting means is within the predetermined range.

Whether or not the RPM detected by RPM detecting means is within a predetermined range determines if high speed and high power are needed in controlling the position of the rotor or not. When it is judged that the detected RPM is within a predetermined range, the first power source is selected.

Thus a selection can be made between the first power source and the second power source also by detecting the RPM of the rotor.

Further, in the magnetic bearing device according to the present invention, the predetermined range includes a resonance point that the rotor passes while rotation of the rotor is accelerated.

When the rotor passes the resonance point while rotation of the rotor is accelerated, the rotor could be vibrated. With this range included in the predetermined range, the position of the rotor can be controlled at high speed and high power upon passing of the resonance point.

The second power source is selected in other periods than this period, so that the magnetic bearing device consumes less electric power.

Further, in the magnetic bearing device according to the present invention, the excitation-drive means is equipped with: a first switch element connected at one end to a positive electrode of the first power source which generates the first electric potential, and connected at the other end to one end of each of the electromagnets; a first rectifier element connected at a forward outlet end to the other end of the first switch element, and connected at a forward inlet end to a negative electrode; a second switch element connected at one end to the other end of each of the electromagnets, and connected at the other end to the negative electrode; a second rectifier element connected at a forward inlet end to the one end of the second switch element, and connected at a forward outlet end to the positive electrode of the first power source; a third switch element connected at one end to a positive electrode of the second power source which generates the second electric potential; a third rectifier element connected at a forward inlet end to the other end of the third switch element, and connected at a forward outlet end to the one end of each of the electromagnets; a fourth switch element connected at one end to the positive electrode of the second power source; and a fourth rectifier element connected at a forward outlet end to the other end of the fourth switch element, and connected at a forward inlet end to the other end of each of the electromagnets, and the selection control means connects and cuts off the first switch element, the second switch element, the third switch element, and the fourth switch element.

This makes it possible to select the first power source or the second power source to drive, through excitation, the electromagnets with a current supplied from the power source thus selected.

Note that, the first switch element, the second switch element, the third switch element, and the fourth switch element are, for example, transistors, in particular, power MOSFETs, and the first rectifier element, the second rectifier element, the third rectifier element, and the fourth rectifier element are, for example, diodes.

Further, in the magnetic bearing device according to the present invention, the selection control means turns on the first switch element and the second switch element in order to select the first power source and increase a current flowing from one end to the other end of each of the electromagnets; the selection control means turns off the first switch element, the second switch element, the third switch element, and the fourth switch element in order to select the first power source and reduce a current flowing from one end to the other end of each of the electromagnets; the selection control means turns on the second switch element and turns off the first switch element and the third switch element, or turns on the first switch element and turns off the second switch element and the fourth switch element, in order to select the first power source and keep a current flowing from one end to the other end of each of the electromagnets constant; the selection control means turns on the second switch element and the third switch element and turns off the first switch element in order to select the second power source and increase a current flowing from one end to the other end of each of the electromagnets; the selection control means turns on the fourth switch element and turns off the first switch element, the second switch element, and the third switch element in order to select the second power source and reduce a current flowing from one end to the other end of each of the electromagnets; and the selection control means turns on the second switch element and turns off the first switch element and the third switch element, or turns on the third switch element and the fourth switch element and turns off the first switch element and the second switch element in order to select the second power source and keep a current flowing from one end to the other end of each of the electromagnets constant.

This makes it possible to, as in the prior art, supply electric power from the first power source to the electromagnets (or regenerate a current) while avoiding through-current from the first power source to the second power source when the first power source is selected to drive, through excitation, the electromagnets.

This also makes it possible to supply electric power from the second power source to the electromagnets (or regenerate a current) when the second power source is selected to drive, through excitation, the electromagnets as well.

Further, in the magnetic bearing device according to the present invention, the excitation-drive means is equipped with: a first switch element connected at one end to a first node, and connected at the other end to one end of each of the electromagnets; a first rectifier element connected at a forward outlet end to the other end of the first switch element, and connected at a forward inlet end to a negative electrode; a second switch element connected at one end to the other end of each of the electromagnets, and connected at the other end to the negative electrode; a second rectifier element connected at a forward inlet end to the one end of the second switch element, and connected at a forward outlet end to a second node; a third switch element connected at one end to a positive electrode of the first power source which generates the first electric potential, and connected at the other end to the first node; a third rectifier element connected at a forward outlet end to the other end of the third switch element, and connected at a forward inlet end to a positive electrode of the second power source which generates the second electric potential; a fourth switch element connected at one end to the positive electrode of the second power source, and connected at the other end to the second node; and a fourth rectifier element connected at a forward inlet end to the other end of the fourth switch element, and connected at a forward outlet end to the positive electrode of the first power source, and the selection control means connects and cuts off the first switch element, the second switch element, the third switch element, and the fourth switch element.

This makes it possible to drive, through excitation, the electromagnets with a current that is supplied from the first power source or second power source selected despite the excitation-drive means having a structure different from the one described above.

Accordingly, a structure that is easy to design can be chosen in designing an excitation-drive control circuit.

Further, in the magnetic bearing device according to the present invention, the selection control means turns on the first switch element, the second switch element and the third switch element in order to select the first power source and increase a current flowing from one end to the other end of each of the electromagnets; the selection control means turns off the first switch element, the second switch element, and the fourth switch element in order to select the first power source and reduce a current flowing from one end to the other end of each of the electromagnets; the selection control means turns on the second switch element and turns off the first switch element, or turns on the first switch element and the third switch element and turns off the second switch element and the fourth switch element, in order to select the first power source and keep a current flowing from one end to the other end of each of the electromagnets constant; the selection control means turns on the first switch element and the second switch element and turns off the third switch element in order to select the second power source and increase a current flowing from one end to the other end of each of the electromagnets; the selection control means turns on the fourth switch element and turns off the first switch element and the second switch element in order to select the second power source and reduce a current flowing from one end to the other end of each of the electromagnets; and the selection control means turns on the second switch element and turns off the first switch element, or turns on the first switch element and the fourth switch element and turns off the second switch element and the third switch element in order to select the second power source and keep a current flowing from one end to the other end of each of the electromagnets constant.

In this case also, similar effect can be obtained by a control operation different from the one described above.

Accordingly, a structure that is easy to control can be chosen in controlling the excitation-drive control circuit.

Further, in the magnetic bearing device according to the present invention, the plural electromagnets are arranged; the excitation-drive control circuit controls the plural electromagnets individually; and the plural electromagnets share at least one of the first node and the second node in the excitation-drive control circuit.

This makes it possible to share the third switch element, the third rectifier element, the fourth switch element, and the fourth rectifier element, thereby reducing the total number of elements in the circuit.

In this case, the elements serve as sources of electric power for every electromagnet and it is therefore desirable for the elements to have high driving ability to a certain degree.

Further, in the magnetic bearing device according to the present invention, the current/magnetic flux detecting means is connected in series to at least one element out of the electromagnets, the first switch element, the second switch element, the third switch element, the fourth switch element, the first rectifier element, the second rectifier element, the third rectifier element, and the fourth rectifier element, and is equipped with a current detecting circuit for detecting a current that flows in the element connected.

The present invention provides a magnetic bearing device, including: a rotor; position control means for controlling at least one of a radial position and an axial position of the rotor using electromagnets; and an excitation-drive control circuit for driving, through excitation, the electromagnets and for controlling excitation-drive of the electromagnets, in which the excitation-drive control circuit is equipped with: N power sources that generate two or more electric potentials; excitation-drive means which can select one of the N power sources and which drives, through excitation, the electromagnets with a current supplied from the power source selected; and selection control means for selecting, in accordance with a predetermined operation mode, the power source to be selected at the excitation-drive means.

In this way, a selection can be made not only between the first power source and the second power source but also among power sources having intermediate electric potentials between the first electric potential and the second electric potential.

If a power source having an electric potential higher than that of the first power source is selected, the position of the rotor can be controlled at even higher speed and power. On the other hand, if a power source having an electric potential lower than that of the second power source is selected, an operation with even less vibration is achieved.

Further, the present invention provides a pump device including a magnetic bearing device, in which the pump device is connected to subject equipment to suck a predetermined gas out of the subject equipment.

As a result, vibration, as well as electric and magnetic noise, generated from the pump device can be reduced while making it possible to control the position of the rotor at high speed and high power.

Accordingly, the electric and magnetic noise transmitted to the subject equipment can be reduced and can be kept from affecting the semiconductor manufacture, the measurement with the electron scope, etc.

Further, the pump device according to the present invention further includes task judging means for judging whether or not a task carried out in the subject equipment is a predetermined task, in which the selection control means selects the second power source when the task judging means judges that a task carried out in the subject equipment is the predetermined task.

Whether or not a task carried out in subject equipment is a predetermined task determines if there is need to control the position of the rotor with low vibration or not. When it is judged that a task carried out in subject equipment is a predetermined task, the second power source is selected.

In this way, a selection can be made between the first power source and the second power source also by judging a task that is carried out in subject equipment.

A predetermined task is, for example, irradiation of an ultraviolet ray on a semiconductor wafer or irradiation of an electron beam for measurement by an electron microscope in subject equipment.

BRIEF DESCRIPTION OF THE DRAWINGS

In the accompanying drawings:

FIG. 2 is a diagram showing how an electromagnet current is controlled;

FIG. 6 is a diagram showing how an electromagnet current is controlled;

FIG. 10 is a time chart showing a control operation for when a current command value is smaller than a detection value.

DETAILED DESCRIPTION OF THE PREFERRED EMBODIMENTS

A first embodiment of the present invention is described below.

Figure 1:
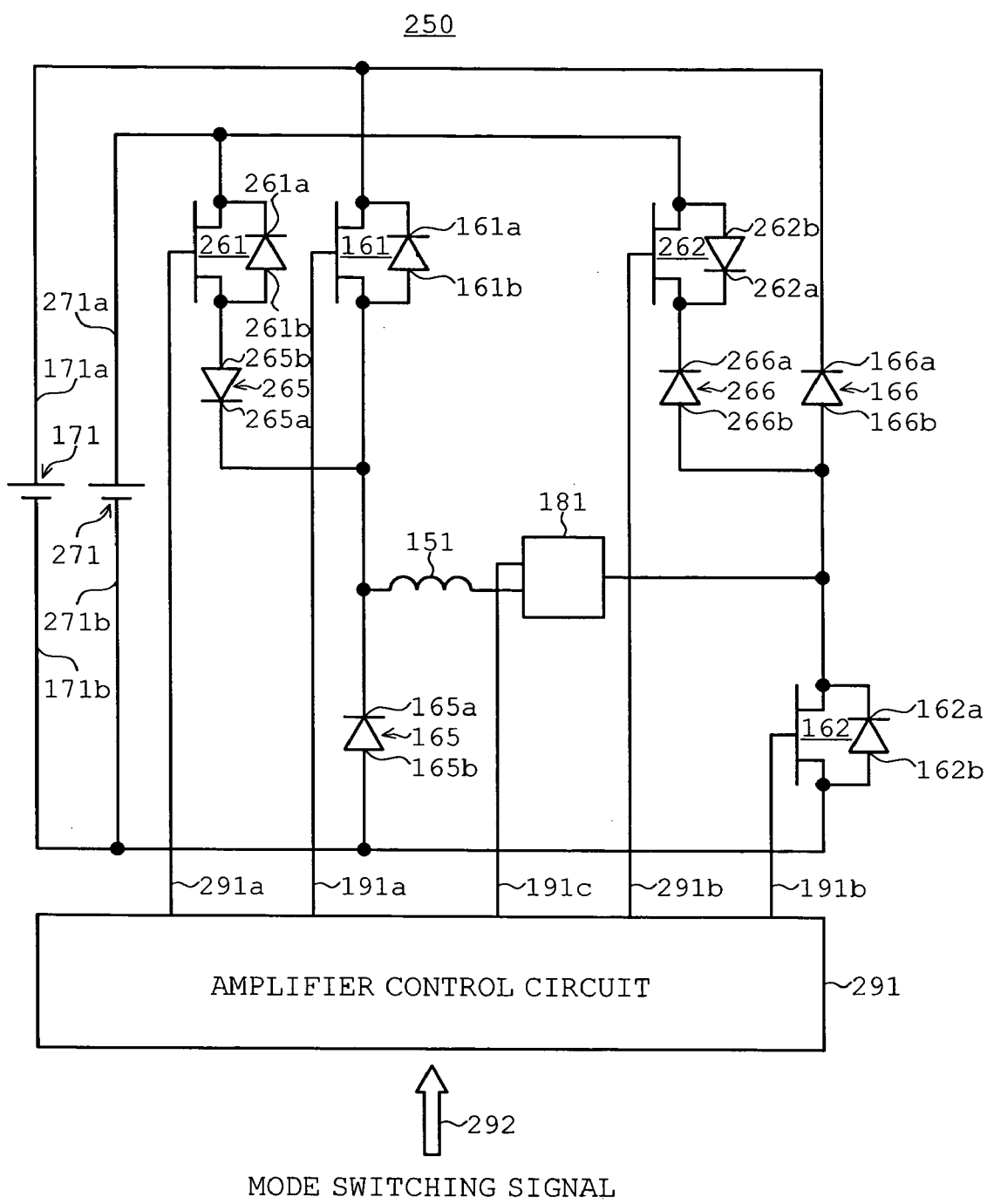
FIG. 1 is a circuit diagram of an amplifier circuit according to a first embodiment of the present invention.
Figure 8:
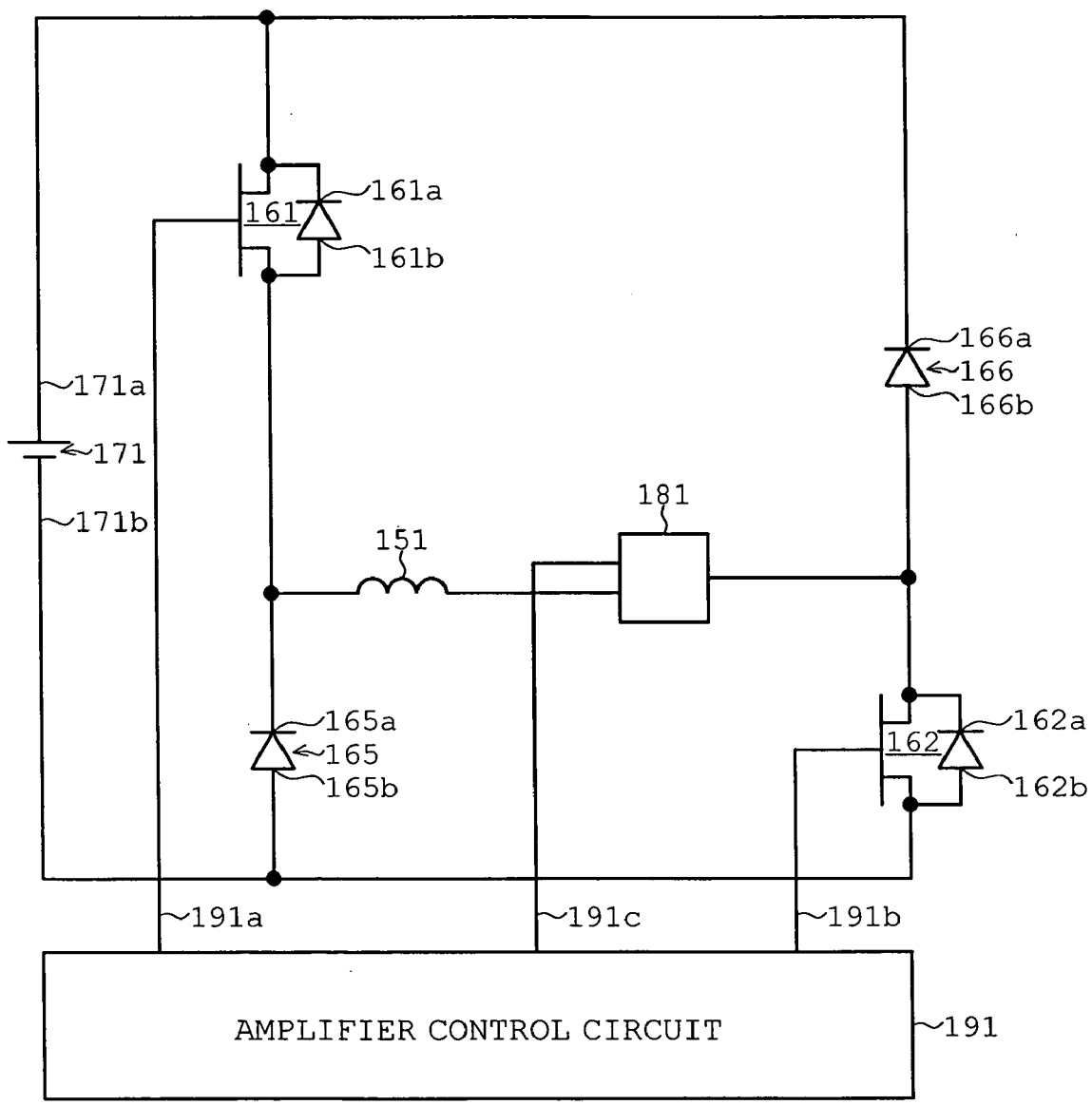
FIG. 8 is a circuit diagram of a conventional amplifier circuit.

FIG. 1 shows a circuit diagram of an amplifier circuit according to the first embodiment of the present invention. In FIG. 1, components identical to those in FIG. 8 are denoted by the same reference symbols and descriptions thereof are omitted. A high voltage power source 171 is identical with the power source 171 of the prior art, and is called so solely for discriminating it from a low voltage power source 271, which will be described later.

In FIG. 1, an electromagnet coil 151 is connected at one end to a positive electrode 171a of the high voltage power source 171 through a transistor 161 (as in the prior art). The one end of the electromagnet coil 151 is also connected to a positive electrode 271a of the low voltage power source 271 through a diode 265 and through a transistor 261.

The transistor 261 is, similar to the transistor 161 and other transistors, a power MOSFET, and is structured to have a diode between its source and drain. A cathode terminal 261a of the diode of the transistor 261 is connected to the positive electrode 271a of the low voltage power source 271, whereas an anode terminal 261b of the diode is connected to an anode terminal 265b of the diode 265. The diode 265 has a cathode terminal 265a connected to the one end of the electromagnet coil 151.

The other end of the electromagnet coil 151 is connected, through a current detecting circuit 181, to a transistor 162 and a diode 166 (as in the prior art) and, in addition, to an anode terminal 266b of a diode 266. The other end of the electromagnet coil 151 is also connected through the current detecting circuit 181, the diode 266, and a transistor 262 to the positive electrode 271a of the low voltage power source 271.

The transistor 262 is, similar to the transistor 261, a power MOSFET, and is structured to have a diode between its source and drain. An anode terminal 262b of the diode of the transistor 262 is connected to the positive electrode 271a of the low voltage power source 271, whereas a cathode terminal 262a of the diode is connected to a cathode terminal 266a of the diode 266.

Similar to a conventional amplifier circuit 150, an amplifier circuit 250 structured as above is for electromagnets 104, 105, 106A, and 106B, whereas another amplifier circuit 250 is built for other electromagnets 105, 106A, and 106B.

An amplifier control circuit 291 is as in the prior art a circuit in a DSP unit, and makes it possible to switch on and off the transistors 161, 162, 261, and 262.

The DSP unit and its amplifier control circuit 291 compare a current value detected by the current detecting circuit 181 with a predetermined current command value. Based on the result of the comparison, a pulse width time Tp1 or Tp2 of pulses to be generated in a control cycle Ts is determined. Then the amplifier control circuit 291 outputs gate drive signals 191a, 191b, 291a, and 291b having the thus determined pulse width time Tp1 or Tp2 to gate terminals of the transistors 161, 162, 261, and 262.

The amplifier control circuit 291 receives a mode switching signal 292 for switching between a high voltage mode and a low voltage mode (will be described later) in the amplifier circuit 250.

The high voltage power source 171 is, as in the prior art, a high voltage power source of about 50 V, for example, in order that the position of a rotor 103 can be controlled at high speed and high power.

On the other hand, unlike the high voltage power source 171, the low voltage power source 271 is a low voltage power source of about 15 V, for example, so that the electric and magnetic noise generated in the electromagnet coil 151 is reduced. Hereinafter, the electric potential of the positive electrode 171a of the high voltage power source 171 is referred to as a voltage Vh and the electric potential of the positive electrode 271a of the low voltage power source 271 is referred to as a voltage Vl (a negative electrode 171b of the high voltage power source 171 and a negative electrode 271b of the low voltage power source 271 have a common electric potential, which is 0 V).

It is usually desirable to connect a capacitor (not shown in the drawing) between the positive electrode 171a and the negative electrode 171b of the high voltage power source 171 and between the positive electrode 271a and the negative electrode 271b of the low voltage power source 271 similar to the prior art in order to stabilize the power sources 171 and 271.

The current detecting circuit 181 is connected in series only to the electromagnet coil 151. Alternatively, the current detecting circuit 181 may be connected in series only to the transistor 161, 162, 261, or 262, or the diode 165, 166, 265, or 266.

Desirably, an overcurrent protection device and an overvoltage protection device (omitted from the drawing) are provided in the positive electrode 171a of the high voltage power source 171 and the positive electrode 271a of the low voltage power source 271. These protection devices make it possible to avoid break down of the whole pump device when the transistor 161 and other transistors and the diode 265 and other diodes are broken causing short circuit between the high voltage power source 171 and the low voltage power source 271.

A voltage to be applied to the gate terminal to turn the transistor 161, 162, or 261 on is about 15 V plus the voltage of the power source that is connected to the source terminal of the transistor. Specifically, a total voltage of the voltage Vh+about 15 V is applied to the gate terminal of the transistor 161, about +15 V is applied to the gate terminal of the transistor 162, and a total voltage of the voltage Vl+about 15 V is applied to the gate terminal of the transistor 261.

In the case of the transistor 262, on the other hand, it is desirable to apply a voltage higher than the voltage Vl (e.g., about 30V) to its gate terminal since a current regenerated in the amplifier circuit 250 has to be transferred to the positive electrode 271a of the low voltage power source 271. The voltage of 30 V may be obtained by dropping the voltage of the high voltage power source 171 or, conversely, by boosting the voltage of the low voltage power source 271. In either case, electric power to be supplied has only to be larger than required to drive the gate terminal of the transistor 262 and the circuit area is hardly increased.

The cathode terminals 165a and 265a of the diodes 165 and 265 are connected to the same node, and it is therefore desirable to use a so-called twin diode for the diode 165 and the diode 265. This applies also to the diode 166 and the diode 266. The parts of the members that constitute the amplifier circuit 250 thus can be reduced in number.

The amplifier circuit 250 structured as above is switched between a high voltage mode in which the electromagnet coil 151 is supplied with electric power from the high voltage power source 171 and a low voltage mode in which the electromagnet coil 151 is supplied with electric power from the low voltage power source 271.

First, a description is given on how the electromagnet current iL is controlled in these two modes. FIG. 2 shows how the electromagnet current is controlled.

In FIG. 2, to increase the electromagnet current iL flowing in the electromagnet coil 151 in the high voltage mode, the transistors 161 and 162 are turned on for a time period corresponding to the pulse width time Tp1. Accordingly, similar to the prior art, the electromagnet current iL during this period is increased toward a current value iLmax, which is a maximum current possible to flow from the positive electrode 171a to the negative electrode 171b through the transistors 161 and 162.

The voltage applied to the anode terminal 265b of the diode 265 at this point is the voltage Vl at maximum. Therefore, the voltage Vh of the high voltage power source 171 is not applied to the low voltage power source 271 through the diode 265. Similarly, a current from the electromagnet coil 151 does not flow into the low voltage power source 271 through the diode 266 since the anode terminal 266b of the diode 266 has a voltage level of approximately 0 V.

The column for the transistor 261 in FIG. 2 is marked with (off), which means that the transistor can be on or off. To elaborate, the transistor 261 can be on or off either since the voltage Vh is not applied to the transistor 261 by the diode 265 when the electromagnet current iL is to be increased. However, taking other cases (when the electromagnet current iL is to be reduced or kept constant) into account, control of the gate drive signal 291a is easier when the transistor 261 is off, and hence the column is marked with (off). The same applies to the transistor 262.

To reduce the electromagnet current iL flowing in the electromagnet coil 151 in the high voltage mode, the transistors 161, 162, 261, and 262 are turned off for a time period corresponding to the pulse width time Tp2. Accordingly, similar to the prior art, the electromagnet current iL during this period is decreased toward a current value iLmin that can be regenerated from the negative electrode 171b to the positive electrode 171a through the diodes 165 and 166.

In this case, turning the transistors 161 and 162 off makes current regeneration possible as in the prior art and turning the transistor 262 off makes it possible to avoid a situation in which a high voltage (of the regenerated current) is applied to the low voltage power source 271 through the transistor 262.

To keep the electromagnet current iL flowing in the electromagnet coil 151 constant in the high voltage mode, the transistor 162 is turned on, whereas the transistors 161 and 261 are turned off, for example. Another way is to turn the transistor 161 on, whereas the transistors 162 and 262 are turned off. Accordingly, similar to the prior art, a flywheel current is maintained in the amplifier circuit 250 during this period.

On the other hand, to increase the electromagnet current iL flowing in the electromagnet coil 151 in the low voltage mode, the transistors 162 and 261 are turned on, whereas the transistor 161 is turned off for a time period corresponding to the pulse width time Tp1. Accordingly, the electromagnet current iL during this period is increased toward a current value iLmax, which is a maximum current possible to flow from the positive electrode 271a to the negative electrode 271b of the low voltage power source 271 through the transistor 261, the diode 265, and the transistor 162.

In this case, with the transistor 261 on and the transistor 161 off, the electromagnet coil 151 is supplied with electric power from the low voltage power source 271 instead of the high voltage power source 171. Furthermore, a current from the electromagnet coil 151 does not flow into the high voltage power source 171 through the diode 166 since the cathode terminal 166a of the diode 166 is connected to the positive electrode 171a.

To reduce the electromagnet current iL flowing in the electromagnet coil 151 in the low voltage mode, the transistor 262 is turned on and the transistors 161, 162, and 261 are turned off for a time period corresponding to the pulse width time Tp2. Accordingly, the electromagnet current iL during this period is decreased toward a current value iLmin that can be regenerated from the negative electrode 271b to the positive electrode 271a of the low voltage power source 271 through the diode 165, the diode 266, and the transistor 262.

In this case, similar to the high voltage mode, turning the transistors 261 and 162 off makes current regeneration possible and turning the transistor 262 on secures a regeneration path to the low voltage power source 271. Furthermore, the regenerated current usually does not flow into the high voltage power source 171 since the cathode terminal 166a of the diode 166 is connected to the positive electrode 171a.

To keep the electromagnet current iL flowing in the electromagnet coil 151 constant in the low voltage mode, the transistor 162 is turned on, whereas the transistors 161 and 261 are turned off, for example. Another way is to turn the transistors 261 and 262 on, whereas the transistors 161 and 162 are turned off. Accordingly, similar to the prior art, a flywheel current is maintained in the amplifier circuit 250 during this period.

By controlling the transistors 161, 162, 261, and 262 in the manner described above, the high voltage mode achieves supply of electric power (or regeneration of a current) from the high voltage power source 171 to the electromagnet coil 151 as in the prior art while avoiding a through-current from the high voltage power source 171 to the low voltage power source 271. The low voltage mode achieves supply of electric power (or regeneration of a current) from the low voltage power source 271 to the electromagnet coil 151.

Next, a description is given on transition between the high voltage mode and the low voltage mode.

An operation for switching between the two modes will be described first. The switching operation is illustrated in a flow chart of FIG. 3.

Figure 3:
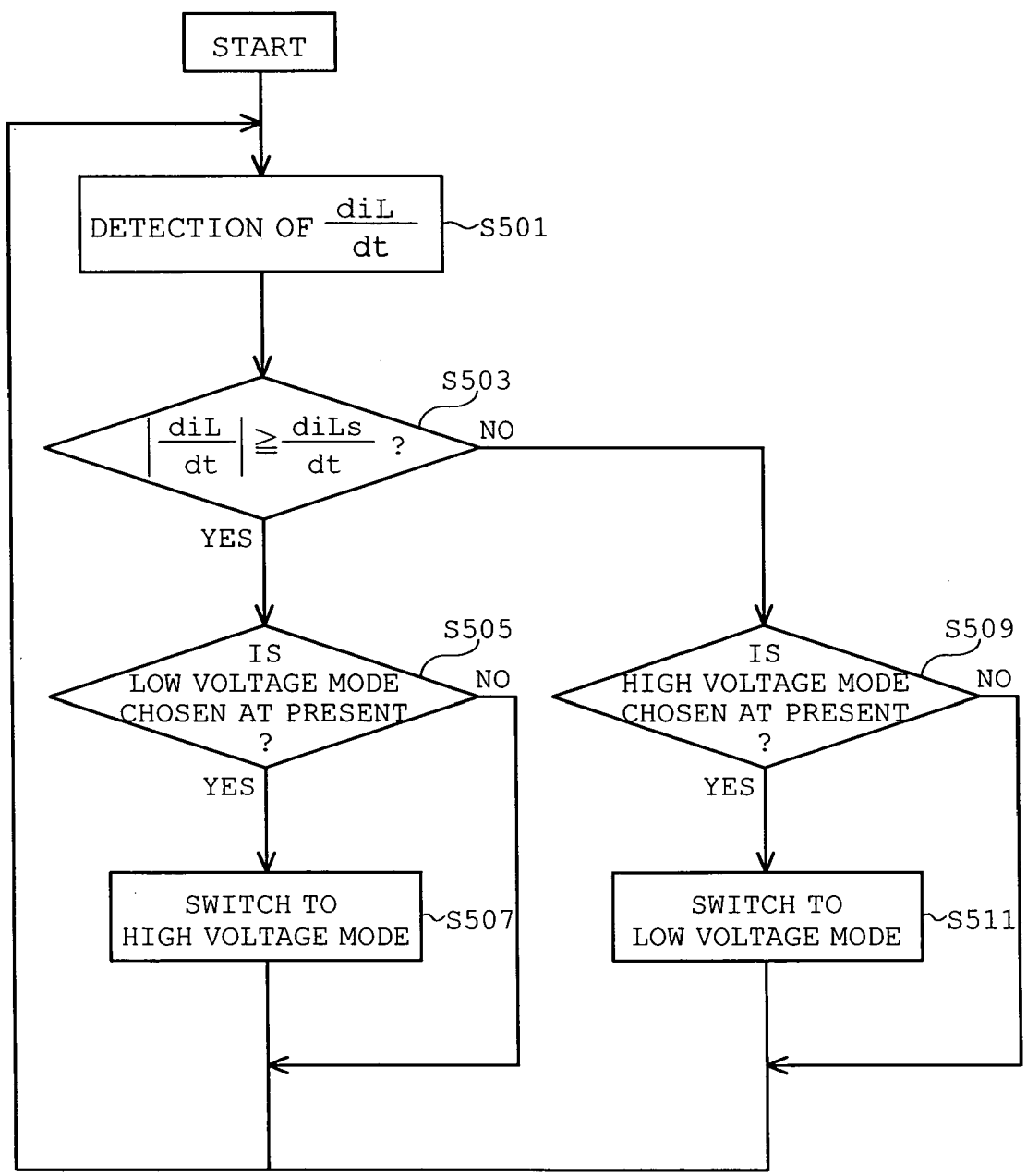
FIG. 3 is a flow chart showing a mode switching operation.

In Step S501 of FIG. 3 (abbreviated as S501 in the drawing, the same applies to the rest of the steps), a momentary change with time of the electromagnet current iL at a certain time within the control cycle Ts, namely, a current change speed diL/dt, is detected from the amount of the electromagnet current iL that is detected by the current detecting circuit 181.

To detect the current change speed diL/dt, the detection may be made for each control cycle Ts. Alternatively, the current change speed diL/dt may be stored for every few cycles (for example, three cycles) of the control cycle Ts, so that the mean value of the stored data is detected. In this way, a momentary current ripple or the like (will be described later) is prevented from switching branches in Step S503.

Although not shown in the drawing, a change in amount of the electromagnet current iL within the control cycle Ts, namely, a current change amount ΔiL, may be detected in Step S501 instead of detecting the current change speed diL/dt. In this case also, the current change amount ΔiL may be detected for each control cycle Ts or the detection may be made based on a mean value of the current change amount ΔiL stored for every few cycles of the control cycle Ts.

In either way, an index value that indicates the amount of change in electromagnet current iL (the current change speed diL/dt or the current change amount ΔiL) is detected to know whether or not a rapid change in electromagnet current iL is needed to control the position of the rotor 103, in other words, whether or not high speed and high power are needed to control the position of the rotor 103.

In Step S503, next, it is judged whether or not the current change speed diL/dt (the absolute value of the current change speed diL/dt, strictly speaking) is below a predetermined reference current change speed diLs/dt. The reference current change speed diLs/dt is a value for determining if high speed and high power are needed in positional control of the rotor 103 or not.

When the current change speed diL/dt is equal to or larger than a reference current change speed diLs/dt, high speed and high power are necessary to control the position of the rotor 103 and the amplifier circuit 250 has to be switched to the high voltage mode. On the other hand, when the current change speed diL/dt is less than the reference current change speed diLs/dt, high speed and high power are not needed in positional control of the rotor 103 and therefore the amplifier circuit 250 has to be switched to the low voltage mode in order to reduce electric and magnetic noise generated in the electromagnet coil 151.

In Step S505, whether or not the amplifier circuit 250 is in the low voltage mode is detected in the case where it is judged in Step S503 that the current change speed diL/dt is equal to or larger than the reference current change speed diLs/dt. The detection as to whether or not the amplifier circuit 250 is in the low voltage mode is easily made by detecting the mode switching signal 292 that is inputted to the amplifier control circuit 291.

If it is judged in Step S505 that the amplifier circuit 250 is in the low voltage mode, the amplifier circuit 250 is switched to the high-voltage mode in Step S507. In this case, the mode switching signal 292 that is switched to the high voltage mode is inputted to the amplifier control circuit 291. After the amplifier circuit 250 is switched to the high voltage mode in Step S507, the process returns to Step S501 to detect the current change speed diL/dt.

On the other hand, if it is judged in Step S505 that the amplifier circuit 250 is not in the low voltage mode (is in the high voltage mode), the process directly returns to Step S501 to detect the current change speed diL/dt.

In contrast to Step S505, detected in Step S509 when the judgment result of Step S503 shows that the current change speed diL/dt is below the reference current change speed diLs/dt is whether or not the amplifier circuit 250 is in the high voltage mode at present. The detection as to whether or not the amplifier circuit 250 is in the high voltage is easily made by detecting the mode switching signal 292 that is inputted to the amplifier control circuit 291 similar to Step S505.

If it is judged in Step S509 that the amplifier circuit 250 is in the high voltage mode, the amplifier circuit 250 is switched to the low voltage mode in Step S511. In this case, similar to Step S507, the mode switching signal 292 that is switched to the low voltage mode is inputted to the amplifier control circuit 291. After the amplifier circuit 250 is switched to the low voltage mode in Step S511, the process returns to Step S501 to detect the current change speed diL/dt.

On the other hand, if it is judged in Step S509 that the amplifier circuit 250 is not in the high voltage mode (is in the low voltage mode), the process directly returns to Step S501 to detect the current change speed diL/dt.

Thus switching can automatically be made between the two modes under control of the amplifier control circuit 291 and others.

Desirably, Steps S501 through S511 are all completed within one cycle of the control cycle Ts. This is because the mode can be switched each time a new cycle of the control cycle Ts is started.

Described next is how to calculate the pulse width time Tp (the pulse width time Tp1 or Tp2) after switching between the two modes is made.

In the amplifier circuit 250, the current change amount ΔiL, which is the amount of change of the electromagnet coil 151 within a certain control cycle Ts, and a power source voltage Vd (the voltage of the high voltage power source 171 or the low voltage power source 271) have the relation expressed in Equation 1 below according to Kirchhoff's law. The inductance of the electromagnet coil 151 is given as L. The on-resistance of the transistors 161, 162, 261, and 262 that constitute the amplifier circuit 250 is deemed as small enough to be ignored, as well as the on-resistance of the diodes 165, 166, 265, and 266.

$$Vd = L \times \Delta iL / Tp \qquad \text{[Equation 1]}$$

The pulse width time Tp necessary to cause a change corresponding to the current change amount ΔiL within the control cycle Ts is obtained based on Equation 2 below.

$$Tp = L \times \Delta iL / Vd \qquad \text{[Equation 2]}$$

Accordingly, the necessary pulse width time Tp can be obtained from the level of power source voltage Vd at that point.

Specifically, a pulse width time Tph necessary in the high voltage mode is expressed as Equation 3 below, whereas a pulse width time Tpl necessary in the low voltage mode is expressed as Equation 4 below.

$$Tph = L \times \Delta iL / Vh \qquad \text{[Equation 3]}$$

$$Tpl = L \times \Delta iL / Vl \qquad \text{[Equation 4]}$$

Therefore, the ratio of the pulse width times in switching from one mode to the other mode matches the ratio of the reciprocals of the power source voltages (the relation is shown in Equation 5).

$$Tph:Tpl = 1/Vh : 1/Vl \qquad \text{[Equation 5]}$$

Figure 4:
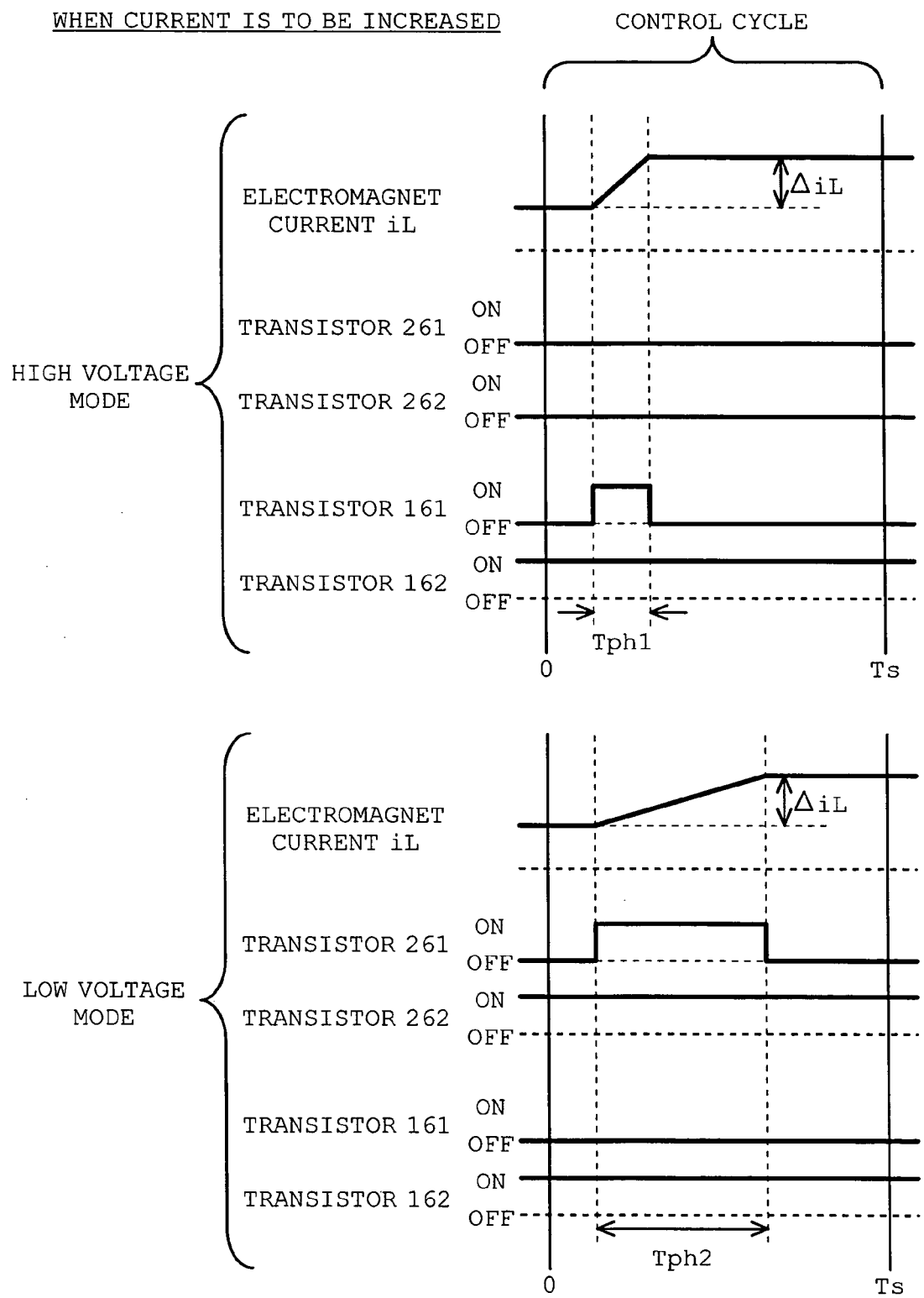
FIG. 4 is a time chart showing control of pulse width time.

FIG. 4 is a time chart showing the above-described pulse width time control in the high voltage mode and the low voltage mode. The time chart of FIG. 4 is for when the current change amount $\Delta iL$ is increased.

Figure 9:
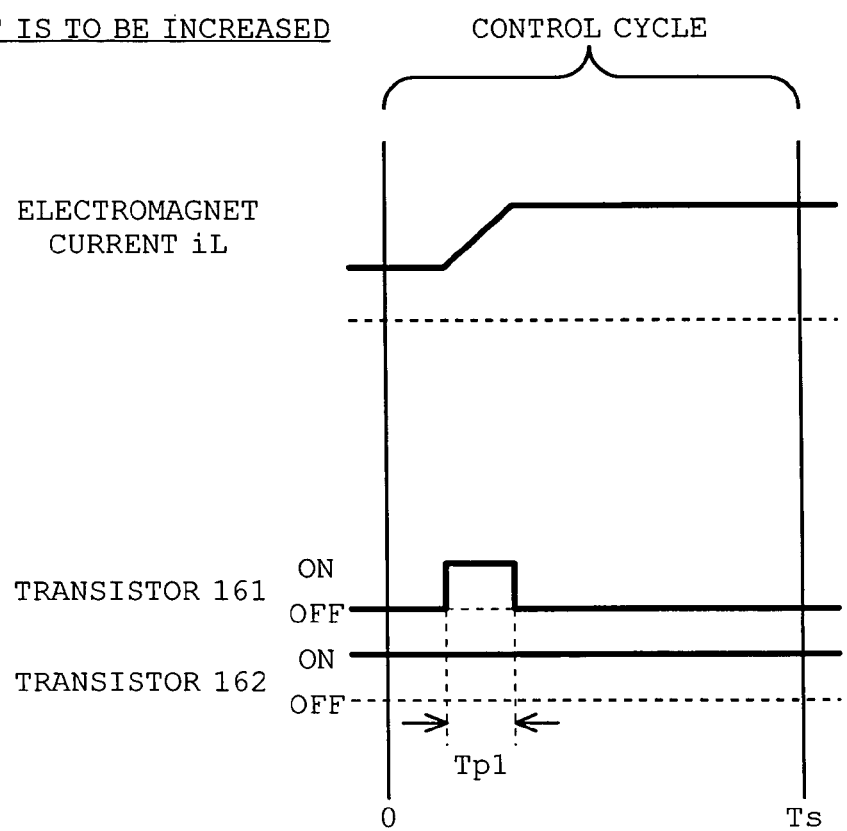
FIG. 9 is a time chart showing a control operation for when a current command value is larger than a detection value.

Pulse width time control in the high voltage mode is identical with that of the prior art (FIG. 9) except the addition of the transistors 261 and 262, and therefore is omitted from FIG. 4.

In pulse width time control in the low voltage mode, the transistors 162 and 261 and others are turned on for a pulse width time Tph2, which is longer than a pulse width time Tph1 of the high voltage mode.

This makes it possible to change the electromagnet current iL within the control cycle Ts in the low voltage mode by an amount equal to the current change amount $\Delta iL$ in the high voltage mode.

In this way, the position of the rotor 103 can be controlled using the low voltage power source 271 except when the rotor 103 has to be controlled in position at high speed and high power. As a result, electric and magnetic noise generated in the electromagnet coil 151 can be reduced and, accordingly, vibration of the rotor 103 due to the electric and magnetic noise can be prevented. Being capable of preventing vibration of the rotor 103 means that a vibration absorbing damper which is (usually) interposed between a turbo molecular pump 100 and a chamber can be omitted, thereby lowering the cost of the turbo molecular pump 100 etc.

In addition, with electric and magnetic noise from the electromagnet coil 151 reduced, electric and magnetic noise that is directly transferred to a chamber from the turbo molecular pump 100 can be reduced as well, thus avoiding an adverse effect over manufacture of a semiconductor, measurement using an electron microscope, or the like.

While electric and magnetic noise is reduced, the electromagnet coil 151 can be supplied with electric power (or regenerated current) from the high voltage power source 171 and therefore the position of the rotor 103 can be controlled at high speed and high power as in the prior art.

Transition between the high voltage mode and the low voltage mode is made based on the level of the electromagnet current iL in the description of this embodiment. However, the present invention is not limited thereto and the transition may be made based on the magnetic flux level of the electromagnet coil 151.

In this case, a voltage detecting circuit (omitted from the drawing) for detecting the voltage at both ends of the electromagnet coil 151 is connected to detect the magnetic flux of the electromagnet coil 151 by the amplifier control circuit 291 or the like from the voltage detected by the voltage detecting circuit and from the electromagnet current iL detected by the current detecting circuit 181.

From the obtained magnetic flux level, the magnetic flux change speed or a mean value thereof may be detected, or the magnetic flux change amount for each control cycle Ts or a mean value thereof may be detected.

In the description of this embodiment, the branch in Step S503 of FIG. 3 is about whether or not the current change speed diL/dt is below the reference current change speed diLs/dt. However, the present invention is not limited thereto.

To give an alternative example, the amplifier circuit 250 may be switched to the high voltage mode only when the rotor 103 passes a resonance point during acceleration since a vibration of the rotor 103 upon passing of a resonance point during acceleration has only to be reduced if the turbo molecular pump 100 and a chamber are set in a place where disturbance is not a problem.

In this case, RPM that creates a resonance point of the rotor 103 (hereinafter referred to as resonance point RPM) is unique to each turbo molecular pump and its rotor 103 and, therefore, detection can be made by measuring the resonance point RPM in advance or by like other method.

For instance, when the resonance point RPM is 6000 rpm, the amplifier circuit 250 is operated in the high voltage mode from the start of rotation of the rotor 103 until the number of rotation well exceeds the resonance point RPM (e.g., about 10000 rpm). Instead of starting the high voltage mode from the start of rotation of the rotor 103, the amplifier circuit 250 may be switched to the high voltage mode as the number of rotation approaches the resonance point RPM (e.g., from about 2000 rpm) in this case.

Accordingly, the branch in Step S503 is about whether or not RPM of the rotor 103 well exceeds (or is sufficiently below) the resonance point RPM.

In this way, the amplifier circuit 250 is operated in the high voltage mode only when positional control of the rotor 103 requires high speed and high power, whereas the low voltage mode is employed in all the other cases. The turbo molecular pump 100 and the control device thus consume less electric power.

Furthermore, the branch in Step S503 may be about other parameters than the resonance point RPM described above.

To elaborate, switching between the high voltage mode and the low voltage mode may be made in accordance with a task carried out in a chamber, such as manufacture of a semiconductor or measurement using an electron microscope.

In this case, a button for giving an instruction to carry out low vibration operation (hereinafter referred to as low vibration operation button) is attached to the turbo molecular pump 100, its control device, or others.

For instance, when a semiconductor wafer is irradiated with ultraviolet rays in the chamber, vibration generated from the turbo molecular pump 100 has to be reduced as much as possible and accordingly the low vibration operation button is depressed. Similarly, the low vibration operation button is depressed when an electron beam is irradiated in the chamber for measurement using an electron microscope.

On the other hand, vibration of the chamber and others could affect as disturbance the turbo molecular pump 100 when a task carried out in the chamber is not ultraviolet irradiation or electron beam irradiation. In such cases, the low vibration operation button is released and the rotor 103 is controlled in the high voltage mode.

The branch in Step S503 is therefore about whether or not the low vibration operation button is depressed. It is also possible to automatically judge at the control device or the like whether or not a task carried out in the chamber needs the low vibration operation from a signal that is outputted from the chamber to inform whether or not the chamber is in a state that needs the low vibration operation.

In this way, the amplifier circuit 250 is operated in the low voltage mode when the low vibration operation is needed, whereas the high voltage mode is employed for other cases where disturbance is expected. As a result, the rotor 103 can be protected against a sudden disturbance.

Also, a condition for the branch in Step S503 may be a combination of the reference current change speed diLs/dt, the resonance point RPM, and a task carried out in a chamber.

This embodiment adopts two types of power sources: the high voltage power source 171 and the low voltage power source 271. However, the present invention is not limited thereto and three or more types of power sources may be employed.

Then an intermediate mode can be set in addition to the high voltage mode and the low voltage mode. Furthermore, this makes it possible to set a mode in which the position of the rotor 103 can be controlled at even higher speed and power than in the high voltage mode, a mode in which the device is run with even less vibration than in the low voltage mode, and the like.

A second embodiment of the present invention is described next.

An amplifier circuit according to the second embodiment is a modification of the amplifier circuit according to the first embodiment.

Figure 5:
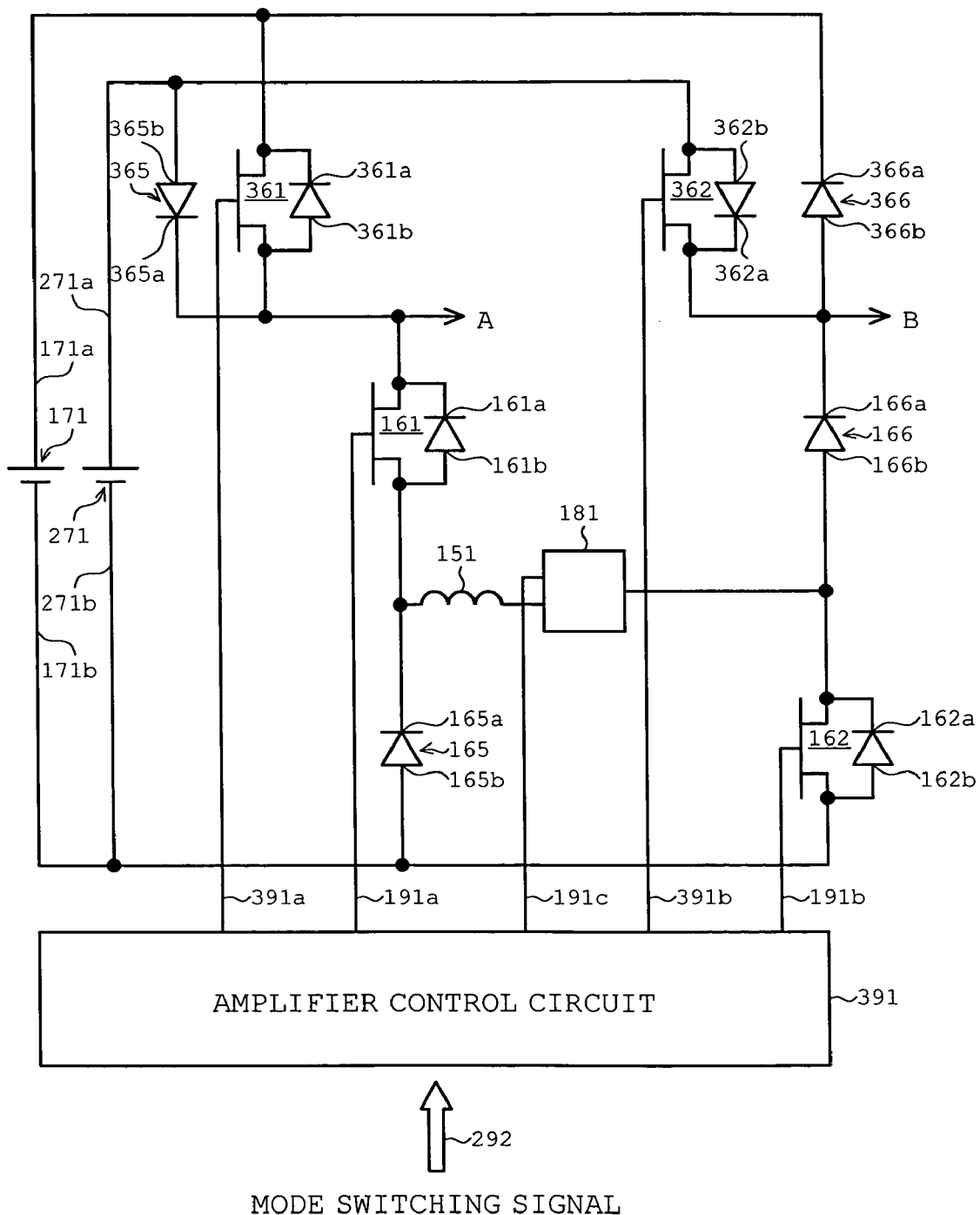
FIG. 5 is a circuit diagram of an amplifier circuit according to a second embodiment of the present invention.
Figure 7:
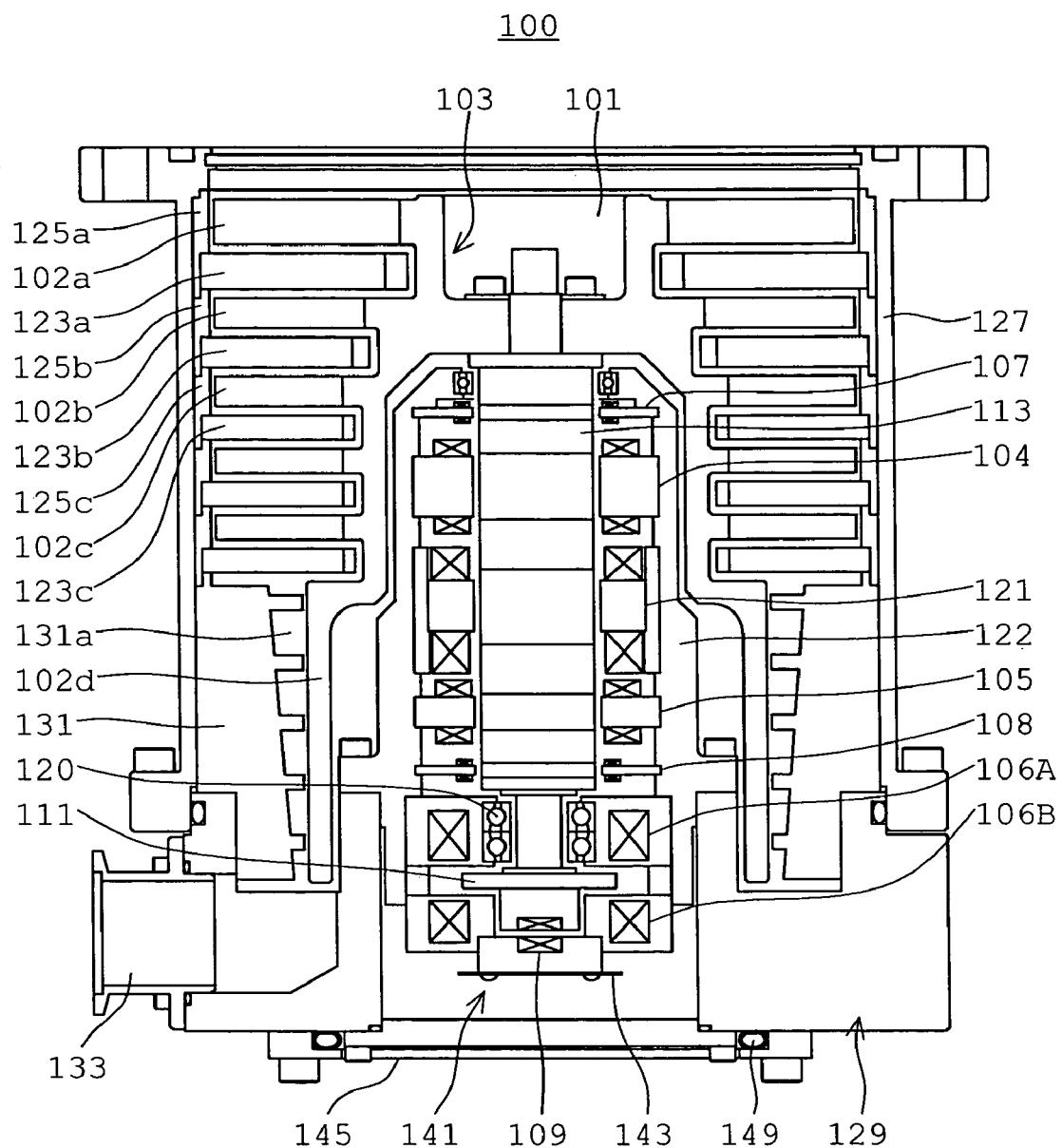
FIG. 7 is a longitudinal sectional view of a turbo molecular pump.

FIG. 5 is a circuit diagram of the amplifier circuit according to the second embodiment of the present invention. In FIG. 5, components identical with those in FIGS. 1 and 8 are denoted by the same reference symbols, and explanations thereof are omitted.

Unlike the amplifier circuit 150 of the prior art, the cathode terminal 161a of the diode of the transistor 161 in FIG. 5 is connected to a transistor 361 and a diode 365.

The transistor 361 is a power MOSFET in which a diode is connected between its source and drain. A cathode terminal 361a of the diode of the transistor 361 is connected to the positive electrode 171a of the high voltage power source 171, whereas an anode terminal 361b of the diode is connected to the transistor 161. An anode terminal 365b of the diode 365 is connected to the positive electrode 271a of the low voltage power source 271, whereas a cathode terminal 365a of the diode is connected to the transistor 161.

The cathode terminal 166a of the diode 166 is, unlike the conventional amplifier circuit 150, connected to a transistor 362 and a diode 366.

In this case, the transistor 362 is a power MOSFET in which a diode is connected between its source and drain. An anode terminal 362b of the diode of the transistor 362 is connected to the positive electrode 271a of the low voltage power source 271, whereas a cathode terminal 362a of the diode is connected to the diode 166. A cathode terminal 366a of the diode 366 is connected to the positive electrode 171a of the high voltage power source 171, whereas an anode terminal 366b of the diode is connected to the diode 166.

Similar to the first embodiment, an amplifier circuit 350 structured as above is for the electromagnets 104, 105, 106A, and 106B, whereas another amplifier circuit 350 is built for other electromagnets 105, 106A, and 106B.

An amplifier control circuit 391 is as in the first embodiment a circuit in a DSP unit, and makes it possible to switch on and off the transistors 161, 162, 361, and 362. In switching on and off the transistors, the amplifier control circuit 391 outputs gate drive signals 191a, 191b, 391a, and 391b having pulse width time Tp1 or Tp2 within the control cycle Ts to the transistors 161, 162, 361, and 362. Similar to the first embodiment, the amplifier control circuit 391 receives the mode switching signal 292 for switching between a high voltage mode and a low voltage mode in the amplifier circuit 350.

Desirably, as in the first embodiment, an overcurrent protection device and an overvoltage protection device (omitted from the drawing) are provided in the positive electrode 171a of the high voltage power source 171 and the positive electrode 271a of the low voltage power source 271.

The voltage to be applied to a gate terminal of the transistor 362 is desirably higher than the voltage V1, for example, about 30 V, similar to the transistor 262 of the first embodiment since a current regenerated in the amplifier circuit 350 has to be transferred to the positive electrode 271a of the low voltage power source 271.

The transistors 361 and 362 and the diodes 365 and 366 are nodes (nodes A and B, respectively, in the drawing) for supplying the transistor 161 and the diode 166 with electric power. It is therefore desirable for every amplifier circuit 350 to share one set of the nodes A and B. In this way, the transistors 361 and 362 and the diodes 365 and 366 can be reduced in number. However, serving as sources of electric power supplied to every amplifier circuit 350, the transistors 361 and 362 and the diodes 365 and 366 should be large in size (channel width for the transistors and junction area for the diodes) to a certain degree.

As in the first embodiment, the amplifier circuit 350 structured as above is switched between a high voltage mode in which the electromagnet coil 151 is supplied with electric power from the high voltage power source 171 and a low voltage mode in which the electromagnet coil 151 is supplied with electric power from the low voltage power source 271.

A description is given on how the electromagnet current iL is controlled in these two modes. FIG. 6 shows how the electromagnet current is controlled.

In FIG. 6, to increase the electromagnet current iL flowing in the electromagnet coil 151 in the high-voltage mode, the transistors 161, 162, and 361 are turned on for a time period corresponding to the pulse width time Tp1. Accordingly, the electromagnet current iL during this period is increased toward a current value iLmax, which is a maximum current possible to flow from the positive electrode 171a to the negative electrode 171b through the transistors 361, 161 and 162.

At this point, a situation in which the voltage Vh from the transistor 361 is applied to the positive electrode 271a through the diode 365 can be avoided since the anode terminal 365b of the diode 365 is connected to the low voltage power source 271. Similarly, a current from the electromagnet coil 151 does not flow into the low voltage power source 271 through the diode 166 since the anode terminal 166b of the diode 166 has a voltage level of approximately 0 V.

To reduce the electromagnet current iL flowing in the electromagnet coil 151 in the high voltage mode, the transistors 161, 162, and 362 are turned off for a time period corresponding to the pulse width time Tp2. Accordingly, the electromagnet current iL during this period is decreased toward a current value iLmin that can be regenerated from the negative electrode 171b to the positive electrode 171a through the diodes 165 and 166 and the diode 366.

In this case, turning the transistors 161 and 162 off makes current regeneration possible as in the prior art and turning the transistor 362 off makes it possible to avoid a situation in which a high voltage (of the regenerated current) is applied to the low voltage power source 271 through the transistor 362.

To keep the electromagnet current iL flowing in the electromagnet coil 151 constant in the high voltage mode, the transistor 162 is turned on, whereas the transistor 161 is turned off, for example. Another way is to turn the transistors 161 and 361 on, whereas the transistors 162 and 362 are turned off. Accordingly, similar to the prior art, a flywheel current is maintained in the amplifier circuit 350 during this period.

In contrast to this, to increase the electromagnet current iL flowing in the electromagnet coil 151 in the low voltage mode, the transistors 161 and 162 are turned on, whereas the transistor 361 is turned off for a time period corresponding to the pulse width time Tp1. Accordingly, the electromagnet current iL during this period is increased toward a current value iLmax, which is a maximum current possible to flow from the positive electrode 271a to the negative electrode 271b of the low voltage power source 271 through the diode 365 and transistors 161 and 162.

In this case, with the transistor 361 off, the electromagnet coil 151 is supplied with electric power from the low voltage power source 271 instead of the high-voltage power source 171. Furthermore, a current from the electromagnet coil 151 does not flow into the high voltage power source 171 through the diode 366 since the cathode terminal 366a of the diode 366 is connected to the positive electrode 171a.

On the other hand, to reduce the electromagnet current iL flowing in the electromagnet coil 151, the transistor 362 is turned on and the transistors 161 and 162 are turned off for a time period corresponding to the pulse width time Tp2. Accordingly, the electromagnet current iL during this period is decreased toward a current value iLmin that can be regenerated from the negative electrode 271b to the positive electrode 271a of the low voltage power source 271 through the diodes 165 and 166 and the transistor 362.

In this case, similar to the high voltage mode, turning the transistors 161 and 162 off makes current regeneration possible and turning the transistor 362 on secures a regeneration path to the low voltage power source 271. Furthermore, the regenerated current does not flow into the high voltage power source 171 since the cathode terminal 366a of the diode 366 is connected to the high voltage power source 171.

To keep the electromagnet current iL flowing in the electromagnet coil 151 constant, the transistor 162 is turned on, whereas the transistor 161 is turned off, for example. Another way is to turn the transistors 161 and 362 on, whereas the transistors 162 and 361 are turned off. Accordingly, similar to the prior art, a flywheel current is maintained in the amplifier circuit 350 during this period.

Controlling the transistors 161, 162, 361, and 362 in the manner described above is another way to achieve in the high voltage mode supply of electric power (or regeneration of a current) from the high voltage power source 171 to the electromagnet coil 151 as in the prior art while avoiding a through-current from the high voltage power source 171 to the low voltage power source 271. This achieves in the low voltage mode supply of electric power (or regeneration of a current) from the low voltage power source 271 to the electromagnet coil 151.

In this embodiment, the operation for switching between the above-described high voltage mode and low voltage mode and the way to determine the pulse width time Tp after switching between the two modes is made are identical with those in the first embodiment, and their explanations are therefore omitted.

Thus the same effects as the first embodiment can be obtained even when a structure different from the first embodiment is employed.

This means that a structure that is easy to design can be chosen in designing the amplifier circuit. It also means that a structure that is easy to control can be chosen in controlling the amplifier circuit.

In addition, elements such as transistors can be reduced in number since every amplifier circuit 350 shares the same nodes A and B.

As described above, the present invention is structured such that, in excitation-drive of the electromagnets, a selection is made in accordance with a predetermined operation mode between a first power source and a second power source that generates an electric potential lower than that of the first power source. Therefore, vibration, as well as electric and magnetic noise, generated from a pump device can be reduced while making it possible to control the position of a rotor at high speed and high power.

What is claimed is:

1. A magnetic bearing device, comprising:
  a rotor;
  position control means for controlling at least one of a radial position and an axial position of the rotor using electromagnets; and
  an excitation-drive control circuit for driving, through excitation, the electromagnets and for controlling excitation-drive of the electromagnets,
  wherein the excitation-drive control circuit is equipped with:
  a first power source that generates a first electric potential;
  a second power source that generates a second electric potential lower than the first electric potential;
  excitation-drive means which has a choice between the first power source and the second power source and which drives, through excitation, the electromagnets with a current supplied from the power source selected; and
  selection control means for selecting, in accordance with a predetermined operation mode, the power source to be chosen at the excitation-drive means.

2. A magnetic bearing device according to claim 1, wherein the selection control means executes cyclic control through PWM control based on a current flowing in the electromagnets.

3. A magnetic bearing device according to claim 1, further comprising:
  current/magnetic flux detecting means for detecting a current or magnetic flux of the electromagnets;
  computing means for computing a predetermined index value from a change in current or magnetic flux detected by the current/magnetic flux detecting means; and
  index value judging means for judging whether or not the index value computed by the computing means is below a reference index value,
  wherein the selection control means selects the first power source when the index value judging means judges that the index value is equal to or larger than the reference index value.

4. A magnetic bearing device according to claim 1, further comprising:
RPM detecting means for detecting RPM of the rotor; and
RPM judging means for judging whether or not the RPM detected by the RPM detecting means is within a predetermined range,
wherein the selection control means selects the first power source when the RPM judging means judges that the RPM detected by the RPM detecting means is within the predetermined range.

5. A magnetic bearing device according to claim 1,
wherein the excitation-drive means is equipped with:
a first switch element connected at one end to a positive electrode of the first power source which generates the first electric potential, and connected at the other end to one end of each of the electromagnets;
a first rectifier element connected at a forward outlet end to the other end of the first switch element, and connected at a forward inlet end to a negative electrode;
a second switch element connected at one end to the other end of each of the electromagnets, and connected at the other end to the negative electrode;
a second rectifier element connected at a forward inlet end to the one end of the second switch element, and connected at a forward outlet end to the positive electrode of the first power source;
a third switch element connected at one end to a positive electrode of the second power source which generates the second electric potential;
a third rectifier element connected at a forward inlet end to the other end of the third switch element, and connected at a forward outlet end to the one end of each of the electromagnets;
a fourth switch element connected at one end to the positive electrode of the second power source; and
a fourth rectifier element connected at a forward outlet end to the other end of the fourth switch element, and connected at a forward inlet end to the other end of each of the electromagnets, and
wherein the selection control means connects and cuts off the first switch element, the second switch element, the third switch element, and the fourth switch element.

6. A magnetic bearing device according to claim 1,
wherein the excitation-drive means is equipped with:
a first switch element connected at one end to a first node, and connected at the other end to one end of each of the electromagnets;
a first rectifier element connected at a forward outlet end to the other end of the first switch element, and connected at a forward inlet end to a negative electrode;
a second switch element connected at one end to the other end of each of the electromagnets, and connected at the other end to the negative electrode;
a second rectifier element connected at a forward inlet end to the one end of the second switch element, and connected at a forward outlet end to a second node;
a third switch element connected at one end to a positive electrode of the first power source which generates the first electric potential, and connected at the other end to the first node;
a third rectifier element connected at a forward outlet end to the other end of the third switch element, and connected at a forward inlet end to a positive electrode of the second power source which generates the second electric potential;
a fourth switch element connected at one end to the positive electrode of the second power source, and connected at the other end to the second node; and
a fourth rectifier element connected at a forward inlet end to the other end of the fourth switch element, and connected at a forward outlet end to the positive electrode of the first power source, and
wherein the selection control means connects and cuts off the first switch element, the second switch element, the third switch element, and the fourth switch element.

7. A magnetic bearing device according to claim 2, wherein a pulse width by the PWM control is computed based on Kirchhoff's law in accordance with the electric potential that is generated from the power source selected by the selection control means.

8. A magnetic bearing device according to claim 2, further comprising:
current/magnetic flux detecting means for detecting a current or magnetic flux of the electromagnets;
computing means for computing a predetermined index value from a change in current or magnetic flux detected by the current/magnetic flux detecting means; and
index value judging means for judging whether or not the index value computed by the computing means is below a reference index value,
wherein the index value is a time differential value or increment or negative increment of the current or the magnetic flux of the electromagnets in a predetermined period, or a mean value of the time differential values or a mean value of the increment or the negative increment in a period longer than the predetermined period,
wherein the predetermined period is as long as one cycle of the PWM control,
wherein the period longer than the predetermined period is as long as two or more cycles of the PWM control, and
wherein the selection control means selects the first power source when the index value judging means judges that the index value is equal to or larger than the reference index value.

9. A magnetic bearing device according to claim 3, wherein the index value is a time differential value or increment or negative increment of the current or the magnetic flux of the electromagnets in a predetermined period, or a mean value of the time differential values or a mean value of the increment or the negative increment in a period longer than the predetermined period.

10. A magnetic bearing device according to claim 4, wherein the predetermined range includes a resonance point that the rotor passes while rotation of the rotor is accelerated.

11. A magnetic bearing device according to claim 5, wherein the current/magnetic flux detecting means is connected in series to at least one element out of the electromagnets, the first switch element, the second switch element, the third switch element, the fourth switch element, the first rectifier element, the second rectifier element, the third rectifier element, and the fourth rectifier element, and is equipped with a current detecting circuit for detecting a current that flows in the element connected.

12. A magnetic bearing device according to claim 5,
wherein the selection control means turns on the first switch element and the second switch element in order to select the first power source and increase a current flowing from one end to the other end of each of the electromagnets, wherein the selection control means turns off the first switch element, the second switch element, the third switch element, and the fourth switch element in order to select the first power source and reduce a current flowing from one end to the other end of each of the electromagnets, wherein the selection control means turns on the second switch element and turns off the first switch element and the third switch element, or turns on the first switch element and turns off the second switch element and the fourth switch element, in order to select the first power source and keep a current flowing from one end to the other end of each of the electromagnets constant, wherein the selection control means turns on the second switch element and the third switch element and turns off the first switch element in order to select the second power source and increase a current flowing from one end to the other end of each of the electromagnets, wherein the selection control means turns on the fourth switch element and turns off the first switch element, the second switch element, and the third switch element in order to select the second power source and reduce a current flowing from one end to the other end of each of the electromagnets, and wherein the selection control means turns on the second switch element and turns off the first switch element and the third switch element, or turns on the third switch element and the fourth switch element and turns off the first switch element and the second switch element in order to select the second power source and keep a current flowing from one end to the other end of each of the electromagnets constant.

13. A magnetic bearing device according to claim 5,
wherein the first switch element, the second switch element, the third switch element, and the fourth switch element are power MOSFETs, and
wherein the first rectifier element, the second rectifier element, the third rectifier element, and the fourth rectifier element are diodes.

14. A magnetic bearing device according to claim 6, wherein the current/magnetic flux detecting means is connected in series to at least one element out of the electromagnets, the first switch element, the second switch element, the third switch element, the fourth switch element, the first rectifier element, the second rectifier element, the third rectifier element, and the fourth rectifier element, and is equipped with a current detecting circuit for detecting a current that flows in the element connected.

15. A magnetic bearing device according to claim 6,
wherein the selection control means turns on the first switch element, the second switch element and the third switch element in order to select the first power source and increase a current flowing from one end to the other end of each of the electromagnets, wherein the selection control means turns off the first switch element, the second switch element, and the fourth switch element in order to select the first power source and reduce a current flowing from one end to the other end of each of the electromagnets, wherein the selection control means turns on the second switch element and turns off the first switch element, or turns on the first switch element and the third switch element and turns off the second switch element and the fourth switch element, in order to select the first power source and keep a current flowing from one end to the other end of each of the electromagnets constant, wherein the selection control means turns on the first switch element and the second switch element and turns off the third switch element in order to select the second power source and increase a current flowing from one end to the other end of each of the electromagnets, wherein the selection control means turns on the fourth switch element and turns off the first switch element and the second switch element in order to select the second power source and reduce a current flowing from one end to the other end of each of the electromagnets, and wherein the selection control means turns on the second switch element and turns off the first switch element, or turns on the first switch element and the fourth switch element and turns off the second switch element and the third switch element in order to select the second power source and keep a current flowing from one end to the other end of each of the electromagnets constant.

16. A magnetic bearing device according to claim 6,
wherein the first switch element, the second switch element, the third switch element, and the fourth switch element are power MOSFETs, and
wherein the first rectifier element, the second rectifier element, the third rectifier element, and the fourth rectifier element are diodes.

17. A magnetic bearing device according to claim 6,
wherein the plural electromagnets are arranged,
wherein the excitation-drive control circuit controls the plural electromagnets individually, and
wherein the plural electromagnets share at least one of the first node and the second node in the excitation-drive control circuit.

18. A magnetic bearing device according to claim 17, wherein the third switch element, the third rectifier element, the fourth switch element, and the fourth rectifier element for the plural electromagnets are each composed of one element.

19. A magnetic bearing device, comprising:
a rotor;
position control means for controlling at least one of a radial position and an axial position of the rotor using electromagnets; and
an excitation-drive control circuit for driving, through excitation, the electromagnets and for controlling excitation-drive of the electromagnets,
wherein the excitation-drive control circuit is equipped with:
N power sources that generate two or more electric potentials;
excitation-drive means which can select one of the N power sources and which drives, through excitation, the electromagnets with a current supplied from the power source selected; and
selection control means for selecting, in accordance with a predetermined operation mode, the power source to be selected at the excitation-drive means.

20. A pump device comprising the magnetic bearing device according to claim 1, wherein the pump device is connected to subject equipment to suck a predetermined gas out of the subject equipment.

21. A pump device according to claim 20, further comprising:
a rotor having rotor blades and a rotor shaft that is placed at the center of the rotor blades; and
a motor for rotating the rotor.

22. A pump device according to claim 20, further comprising task judging means for judging whether or not a task carried out in the subject equipment is a predetermined task, wherein the selection control means selects the second power source when the task judging means judges that a task carried out in the subject equipment is the predetermined task.

23. A pump device according to claim 22, wherein the predetermined task is irradiation of an ultraviolet ray on a semiconductor wafer or irradiation of an electron beam from an electron microscope in the subject equipment.

24. A pump device comprising the magnetic bearing device according to claim 19, wherein the pump device is connected to subject equipment to suck a predetermined gas out of the subject equipment.

25. A pump device according to claim 24, further comprising:

a rotor having rotor blades and a rotor shaft that is placed at the center of the rotor blades; and a motor for rotating the rotor.

26. A pump device according to claim 24, further comprising task judging means for judging whether or not a task carried out in the subject equipment is a predetermined task, wherein the selection control means selects the second power source when the task judging means judges that a task carried out in the subject equipment is the predetermined task.

27. A pump device according to claim 26, wherein the predetermined task is irradiation of an ultraviolet ray on a semiconductor wafer or irradiation of an electron beam from an electron microscope in the subject equipment.

* * * * *